United States Patent
Saito et al.

(10) Patent No.: US 6,972,669 B2
(45) Date of Patent: Dec. 6, 2005

(54) ON-VEHICLE BREAKDOWN-WARNING REPORT SYSTEM

(75) Inventors: Masahiko Saito, Mito (JP); Kozo Nakamura, Hitachiota (JP); Toshio Manaka, Hitachinaka (JP); Takashi Nakahara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/687,866

(22) Filed: Oct. 20, 2003

(65) Prior Publication Data

US 2004/0085198 A1 May 6, 2004

Related U.S. Application Data

(63) Continuation of application No. 09/941,654, filed on Aug. 30, 2001, now abandoned.

(30) Foreign Application Priority Data

Oct. 13, 2000 (JP) .............................. 2000-314180

(51) Int. Cl.[7] .............................................. B60Q 1/00
(52) U.S. Cl. ........................ 340/438; 340/439; 701/29
(58) Field of Search ............................... 340/428, 439, 340/441, 459, 461; 701/29, 31, 35

(56) References Cited

U.S. PATENT DOCUMENTS 4,602,127 A * 7/1986 Neely et al. ................... 379/68
4,989,146 A * 1/1991 Imajo ........................... 701/35
5,442,553 A * 8/1995 Parrillo ........................ 455/420
5,781,125 A * 7/1998 Godau et al. ........... 340/870.01
5,824,889 A * 10/1998 Park et al. ..................... 73/116
5,844,473 A * 12/1998 Kaman ........................ 340/439
5,884,202 A * 3/1999 Arjomand ..................... 701/29
6,175,934 B1 * 1/2001 Hershey et al. ............... 714/25
6,330,499 B1 * 12/2001 Chou et al. ................... 701/33
6,370,454 B1 * 4/2002 Moore .......................... 701/29
6,463,796 B1 * 10/2002 Van Mullekom et al. .. 73/118.1

FOREIGN PATENT DOCUMENTS

| JP | 5-332888 | 12/1993 |
|---|---|---|
| JP | 10-167029 | 6/1998 |
| JP | 10-194095 | 7/1998 |

* cited by examiner

*Primary Examiner*—Toan N. Pham
(74) *Attorney, Agent, or Firm*—Crowell & Morning LLP

(57) ABSTRACT

An on-vehicle breakdown-warning report system is disclosed. an occurrence of break-down is detected and judged based on a signal in an electronic control system installed on a control apparatus for an engine ignition system, a charging system, an engine fuel system, a engine cooling system, a power transmission system, and an oil lubricating system of an automobile or a diagnosis display system; and a diagnostic data is sent to an information terminal device of a diagnosis and maintenance agency or a service company having a diagnosis and maintenance agency as a contents information by using an on-vehicle mobile communication apparatus, and an action for an emergency measures and a maintenance schedule is asked.

6 Claims, 21 Drawing Sheets

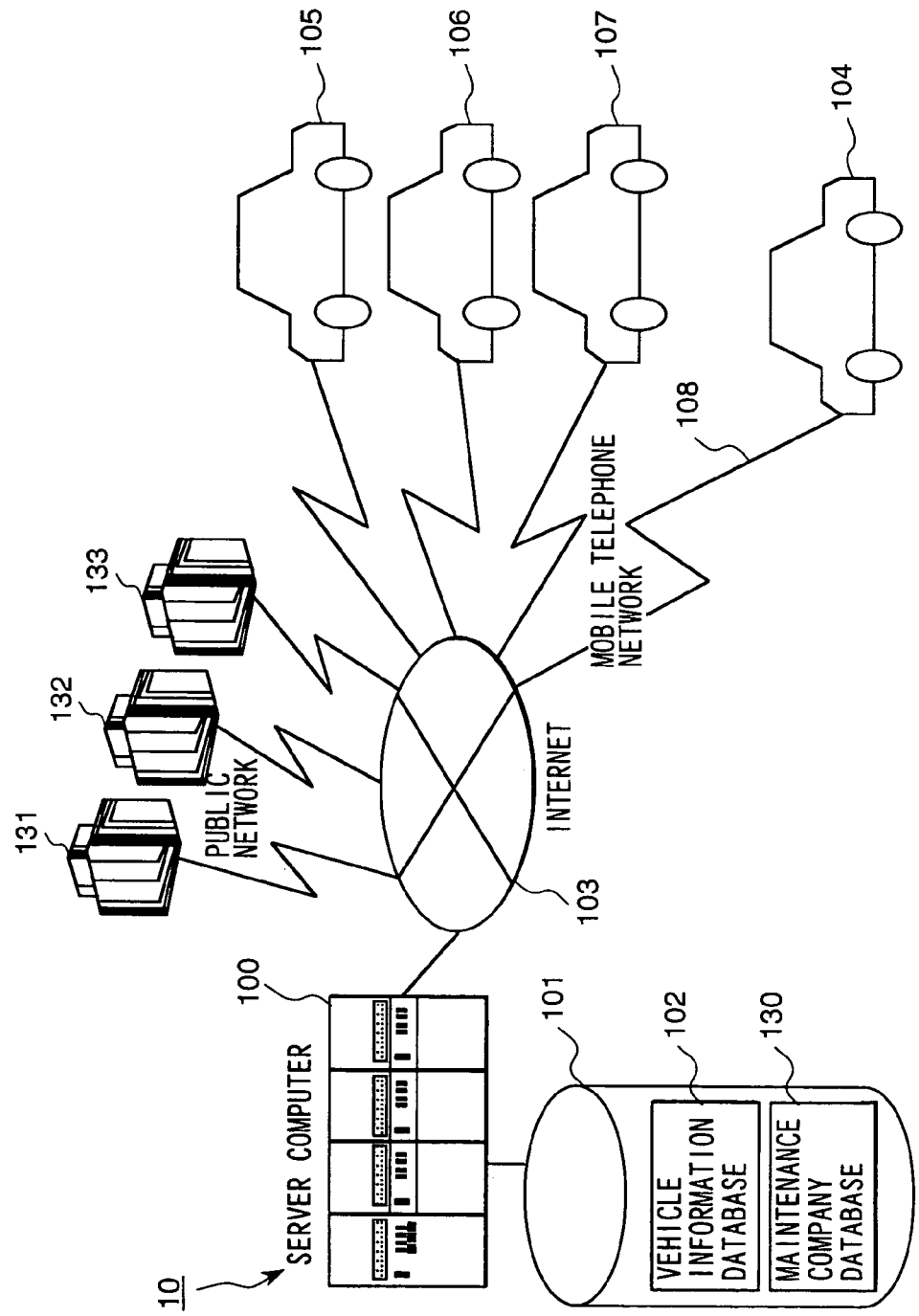

FIG. 3

| MEMBER'S NUMBER | WHERE TO MAKE CONTACT | PRODUCTION NUMBER | PART | PRODUCTION DATE | VALUE | STATUS | RISK |
|---|---|---|---|---|---|---|---|
| 001 | TOKYO, A-CITY, B-TOWN | AAY9424678 | COOLING WATER | 1994-7-20 | 95°C | ABNORMAL | B |
| | | | ENGINE OIL | 2000-1-25 | | GOOD | NO |
| | | | BRAKE PAD | 2000-1-25 | 5mm | DETERIORATED | A |
| | | | SPEED CHANGER | 1994-7-20 | | GOOD | NO |
| | | | ≡ | ≡ | ≡ | ≡ | ≡ |
| | | BCZ9851001 | COOLING WATER | 1998-12-15 | | GOOD | NO |
| | | | ENGINE OIL | 2000-1-25 | | GOOD | NO |
| | | | BRAKE PAD | 2000-1-25 | | GOOD | NO |
| | | | SPEED CHANGER | 1998-12-15 | | GOOD | NO |
| | | | ≡ | ≡ | ≡ | ≡ | ≡ |
| 002 | TOKYO, C-WARD, D | DDW9907005 | COOLING WATER | 1999-2-10 | | GOOD | NO |
| | | | ENGINE OIL | 1999-2-10 | | GOOD | NO |
| | | | BRAKE PAD | 1999-2-10 | | GOOD | NO |
| | | | SPEED CHANGER | 1999-2-10 | | GOOD | NO |
| | | | ≡ | ≡ | ≡ | ≡ | ≡ |
| 003 | IBARAKI-PREFECTURE, E-CITY, F-TOWN | EEW7717125 | COOLING WATER | 1998-12-15 | | GOOD | NO |
| | | | ENGINE OIL | 2000-1-25 | 200cc | DETERIORATED | C |
| | | | BRAKE PAD | 2000-1-25 | 8mm | DETERIORATED | C |
| | | | SPEED CHANGER | 1998-12-15 | | DETERIORATED | C |
| | | | ≡ | ≡ | ≡ | ≡ | ≡ |

FIG. 4

| MEMBER'S NUMBER, MEMBER'S NAME 140 | WHERE TO MAKE CONTACT 141 | PRODUCTION NUMBER 142 | PART 151 | PART-EXCHANGED DATE 152 | MAIN CAUSE 153 | STATUS 154 |
|---|---|---|---|---|---|---|
| 001 KAIIN ICHIRO | TOKYO, A-CITY, B-TOWN | AAY9424678 | ENGINE OIL | 1994-7-20 | CAR SAFETY INSPECTION | DETERIORATED |
| | | | BRAKE PAD | 1994-7-20 | CAR SAFETY INSPECTION | DETERIORATED |
| | | | SPEED CHANGER | 1995-5-15 | TROUBLE | ABNORMAL |
| | | | FRONT PANEL | 1995-9-30 | ACCIDENT | ABNORMAL |
| | | | FRONT GRASS | 1995-9-30 | ACCIDENT | ABNORMAL |
| | | | ENGINE | 1995-9-30 | ACCIDENT | ABNORMAL |
| | | | ENGINE OIL | 1996-7-15 | CAR SAFETY INSPECTION | DETERIORATED |
| | | | BRAKE PAD | 1996-7-15 | CAR SAFETY INSPECTION | DETERIORATED |
| | | | BATTERY | 1996-7-15 | CAR SAFETY INSPECTION | DETERIORATED |
| | | | ≡ | ≡ | ≡ | |

| COMPANY'S NUMBER COMPANY'S NAME | PLACE WHERE TO MAKE CONTACT | COMPANY'S HOLIDAY | BUSINESS TIME | DISTINCTIVE MARK |
|---|---|---|---|---|
| 001 A SOBI K.K. | TOKYO, A-CITY, B-TOWN 03-xxxx-xxxx | WEDNESDAY | 9:00-17:00 | ONE-DAY CAR INSPECTION USER CAR INSPECTION SERVICE |
| 002 B DEALER Y.K. | TOKYO, C-WARD, D 03-xxxx-xxxx | SUNDAY, PUBLIC HOLIDAY | 9:00-19:00 | TRADE-IN ASSESSMENT |
| 003 C SEIBI K.K. | IBARAKI PREFECTURE, E-CITY, F-TOWN 029-zzz-zzzz | TUESDAY | 7:00-16:00 | ONE-DAY CAR INSPECTION |
|  |  |  |  |  |

130

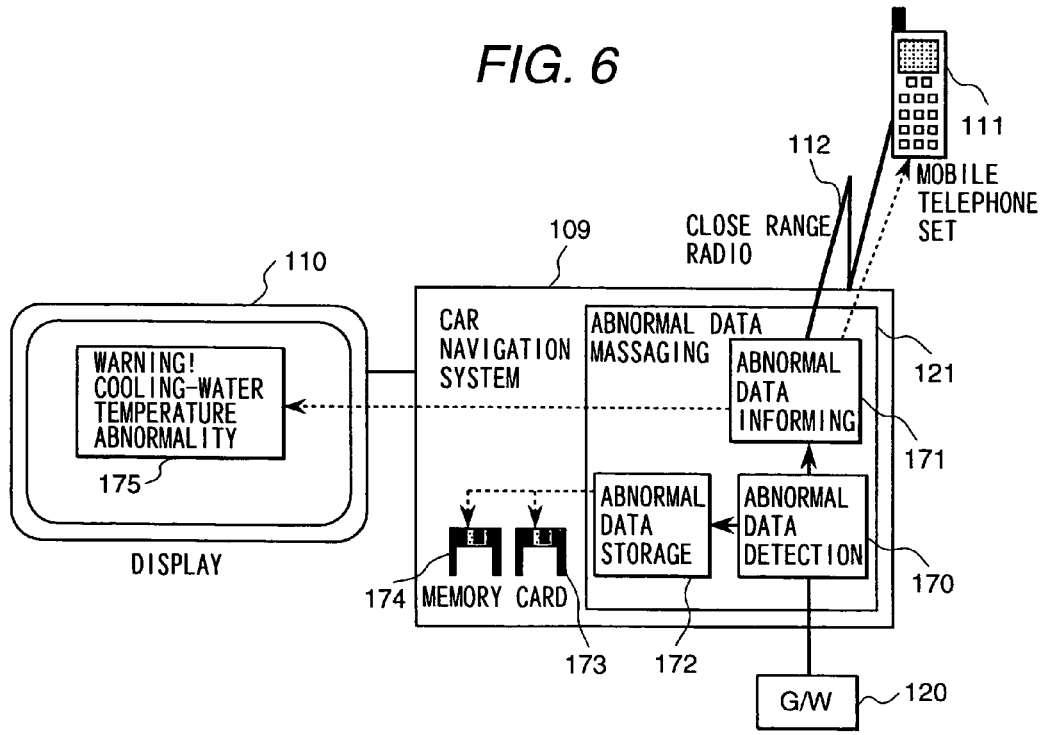

ON-VEHICLE BREAKDOWN-WARNING REPORT SYSTEM

BACKGROUND OF THE INVENTION

The present invention relates to a vehicle breakdown-warning and diagnosis-report system by which the request of the emergency measures is enabled, in which the impossible road running of the vehicle or the breakdown level with the possibility to become a running trouble can be autonomously judged from the signal level obtained from sensors or electric/electronic wirings, and this break-down information can be transmitted to a diagnosis maintenance agency with on-vehicle moving object communication device.

Diagnosis information on the OBD-2(On-Board Diagnosis phase-2) system for the United States and the domestic-oriented on-vehicle diagnosis system is output with the special obtaining diagnosis device, and has been used as maintenance information with CPU diagnosis device of an off board in car maintenance agency so far. However, the on-vehicle diagnosis device is a device of making to the obligation which restricts independence so that the exhaust deterioration rate should not exceed three times the regulation value, and not a device for the break-down diagnosis in the current state. The execution of the on-vehicle break-down diagnosis is difficult, and not put to practical use from twining with the maker guarantee. These diagnosis information is not displayed with on-board as a diagnosis result.

The system by which the user can reserve regular check of the car to the Motor Vehicle Department gate of dealer is established, and the on-vehicle device for the vehicle diagnosis according to diagnosis information is put on the market for such a current state by using the Internet communication according to press release information recently. Thus, the development of the on-vehicle device of the breakdown foresight diagnosis has become real at last.

On the other hand, control diagnosis information on the vehicle is acquired in real-time and transmitted in cooperate with the cellular phone using a short distance wireless communication and packet communication in high speed and with low price via Internet, which is becoming into practical and available technology today.

The remote diagnostic system constructed by using the above-mentioned technology is disclosed in, for example, the Japanese Patent Application Laid-Open No. 10-167029, the Japanese Patent Application Laid-Open No. 5-332888 and the Japanese Patent Application Laid-Open No. 10-194095. In a well known each example, diagnostic module arranged outside of the vehicle acquires the data when the vehicle breaks down by communicating with the wireless module installed in the vehicle, and, as a result, the technology which diagnoses the break-down remotely is indicated.

In the situation like the above-mentioned, when the on-board fault diagnosis equipment reports to the driver that there occurs a the breakdown leading to the possibility to become a running trouble or the present running, there must be some means to show the process by which the driver can promptly transmit abnormal data to maintenance agency of best in the scene and the maintenance agency decides the driver the counter measure.

Especially, an important point is to make the driver select best maintenance agency. According to said prior art, the driver communicates only with the predetermined maintenance agency, or performs the wireless communication with the diagnosis module in the corresponding maintenance agency. Therefore, the above-mentioned prior art was merely a wireless method of the conventional one in which the diagnosis module and the vehicle is connected by a cable. This method is not a service system which stood in consumer's side where the driver can judge and selects the sales day of a plurality of maintenance agencys, the maintenance charge and the content of service, etc.

SUMMARY OF THE INVENTION

An object of the present invention is to provide the best means for selecting a maintenance agency even like the above-mentioned.

The control system of the vehicle which consists of the powertrain which consists of the engine and the power transmission device, the wheel, the steering wheel, the brake, and the suspension outputs the control data in a fixed operating condition respectively. In case that these control data are compared with a permissible data area and the control data deviates from this, abnormal data reporting process installed in the vehicle detects this diagnostic result. Abnormal data reporting process gives the driver warning by using the on-vehicle display. in addition, abnormal data reporting process informs the information peripheral device of the service company of abnormal data information to which the career to data abnormal concerned is shown via the mobile object data communication terminal, the Internet, and public line. In the service company, an abnormal analysis process diagnoses the break-down of the car from abnormal data, retrives one or more maintenance agencys which can repair the breakdown, and provides the result to the said on-vehicle display. At this time, the answer of no of the estimation of no necessary, the exchange parts, and the check maintenance of maintenance and the check measurements necessary is transmitted. The driver sees this, and it is decided whether to do the maintenance order.

Leadership can be taken for the automotive driver to do the maintenance order, and which maintenance agency to be selected. That is. The service company can start up a new business which uses a pertinent database by memorizing abnormal data from the each one movement car and the maintenance situation in the information peripheral device of the service company as a vehicle information data base. For instance, service by which DIRECT MAIL is printed is thought for the owner of the vehicle which agrees with a certain retrieval data. Moreover, because the break-down diagnosis is done beforehand, the time of the break-down diagnosis can be saved for maintenance agency. In addition, the schedule of the servicing easily to receive the maintenance order beforehand. Thus, the present invention provides the business model where the profit is generated for tri-party of the driver, the service company, and maintenance agency.

The business model in which the software which consists of above-mentioned abnormal data reporting process, an abnormal, analytical process, and the vehicle information data base and the business by which the servicing according to the vehicle breakdown foresight diagnosis and this is diagnosed with this software are used as a aid of the check maintenance business in conventional maintenance agency becomes a means to solve the problems of the present invention.

The present invention provides the device of the next concretely fly.

The present invention provides an on-vehicle breakdown-warning report system, in which an occurrence of breakdown is detected and judged based on a signal in an electronic control system installed on a control apparatus for an engine ignition system, a charging system, an engine fuel system, a engine cooling system, a power transmission system, and an oil lubricating system of an automobile or a diagnosis display system; and a diagnostic data is sent to an information terminal device of a diagnosis and maintenance agency or a service company having a diagnosis and maintenance agency as a contents information by using an on-vehicle mobile communication apparatus, and an action for an emergency measures and a maintenance schedule is asked, and provides an on-vehicle breakdown-warning report system, in which an occurrence of break-down is detected and judged based on a signal in an electronic control system installed on a control apparatus for an engine ignition system, a charging system, an engine fuel system, a engine cooling system, a power transmission system, and an oil lubricating system of an automobile or a diagnosis display system; a diagnostic data is sent to an information terminal device of plural diagnosis and maintenance agencies or a service companies having plural diagnosis and maintenance agencies as a contents information by using an on-vehicle mobile communication apparatus, and an action for an emergency measures and a maintenance schedule is asked; and an estimate for maintenance from the diagnosis and maintenance agencies is received and the estimate is presented to a user, the user is allowed to select a diagnosis and maintenance agency.

The present invention provides a vehicle break-down diagnosis and maintenance diagnosis system, in which by comparing a control data of a powertrain and vehicle control system in a designated operation condition with an allowable zone for an ordinary operation condition, when a break-down diagnostic processing program installed in a vehicle provides a diagnosis result reporting that the control data is located outside the allowable zone, the diagnosis result is reported to a driver with an on-vehicle display panel; the break-down diagnostic processing program outputs a diagnostic data karte recording a history reaching an abnormal data, and transmits the diagnostic data karte via a mobile data communication terminal; and an answer from a maintenance agency regarding a necessity for maintenance, an estimate for renewal parts and inspection and maintenance work, and a necessity for inspection and measurement is received, and an inspection and maintenance work is ordered.

The present invention provides a vehicle breakdown-warning report system, having a vehicle maintenance information apparatus comprising
a break-down diagnosis apparatus for outputting a diagnostic result for a control system including powertrain control and vehicle control; an on-vehicle panel for displaying a diagnostic result; an on-vehicle mobile data communication terminal apparatus; and a maintenance information acquisition apparatus for sending a diagnostic result of the component part forming the control system through the mobile data communication terminal apparatus from the on-vehicle panel, and for sending a request for maintenance information to a maintenance agency; and further having a server computer of the maintenance agency comprising an information acquisition means for acquiring information of a maintenance agency inputting a transmission information from said mobile data communication terminal apparatus via Internet; said break-down diagnosis apparatus; and a maintenance information service terminal for answering the maintenance information requested to be served, and provides a vehicle break-down diagnosis and maintenance diagnosis system, in which by comparing a control data of a powertrain and vehicle control system in a designated operation condition with an allowable zone for an ordinary operation condition, when a break-down diagnostic processing program installed in a vehicle provides a diagnosis result reporting that the control data is located outside the allowable zone, the diagnosis result is reported to a driver with an on-vehicle display panel; the break-down diagnostic processing program outputs a diagnostic data karte recording a history reaching an abnormal data, and transmits the diagnostic data karte via a mobile data communication terminal; and an answer from a maintenance agency regarding a necessity for maintenance, an estimate for renewal parts and inspection and maintenance work, and a necessity for inspection and measurement is received, and an inspection and maintenance work is ordered.

The present invention provides a vehicle maintenance information system having a vehicle maintenance information apparatus comprising: a break-down diagnosis apparatus for outputting a diagnostic result for a control system including powertrain control and vehicle control; an on-vehicle panel for displaying a diagnostic result; an on-vehicle mobile data communication terminal apparatus; and a maintenance information acquisition apparatus for sending a diagnostic result of the component part forming the control system through the mobile data communication terminal apparatus from the on-vehicle panel, and for sending a request for maintenance information to a maintenance agency; and further having a server of the maintenance agency comprising a server for acquiring information of a maintenance agency inputting a transmission information from the mobile data communication terminal apparatus via Internet; and a maintenance information service terminal for answering the maintenance information requested to be served.

The server computer is characterized as having a memory apparatus for storing a diagnostic data obtained as a diagnostic result by comparing the control data for the individual component parts or the allowable zone.

The vehicle maintenance information apparatus is characterized as having a inspection and maintenance work ordering system for inputting the request for estimation of the charge for inspection and maintenance work and ordering the inspection and maintenance work.

BRIEF DESCRIPTION OF THE DRAWINGS

FIG. 2 shows a configuration of the business model including maintenance company for the diagnosis maintenance of the vehicle.

FIG. 3 shows contents of the vehicle information data base which brings input past diagnosis career information together in the list form, as for a plurality of members' cars.

FIG. 4 shows other contents of the vehicle information data base which brings input past diagnosis career information together in the list form, as for a plurality of members' cars.

FIG. 5 shows an example of maintenance company information stored in the memory as a data base.

FIG. 6 shows the situation that warning of an abnormal circulating water temperature by the above-mentioned low coolant is displayed on display.

DETAILED DESCRIPTION OF THE INVENTION

Hereafter, the present invention will be concretely explained with reference to the drawings.

Figure 1:
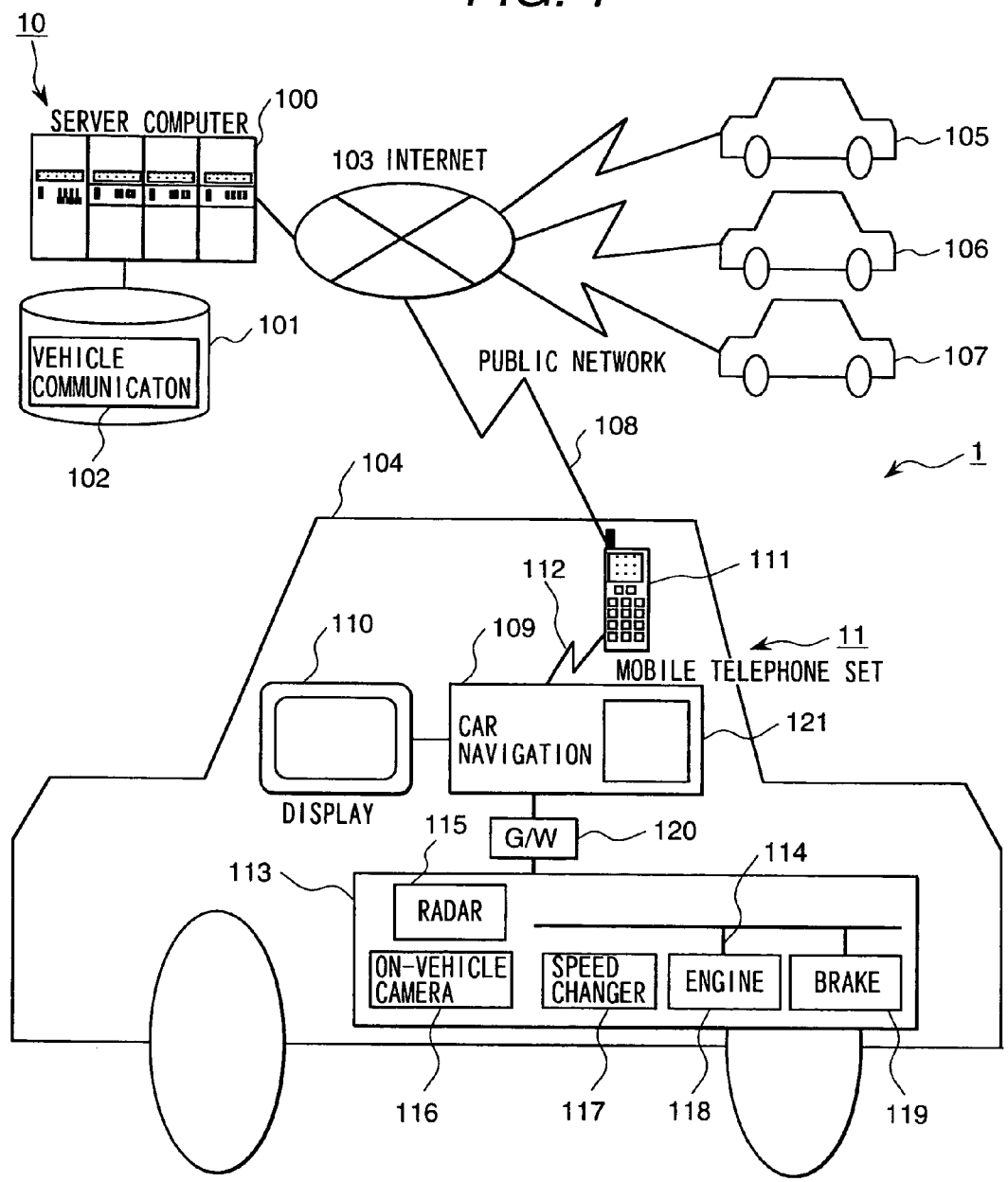
FIG. 1 shows a configuration of the business model concerning the diagnosis and maintenance of the vehicle.

FIG. 1 is a configuration of vehicle maintenance information system 1. Vehicle maintenance information system 1 is composed of the server system 10 (information peripheral device) which contains vehicle breakdown warning report system 11 and server computer 100 of the service company. The owner or the driver of the car becomes the user of this server system 100. Abnormal data report system 121 which collects the break-down diagnosis result, cellular phone 111 having the function of communication with the Internet, display 110 which is an on-vehicle display panel, and car navigation system 109 are installed in car 104. Server system 10, having a computer 100 as described before, receives the vehicle information including abnormal data from plural users' vehicles 104, 105, 106 and 107 by public line 108 via Internet 103, and uses this information to diagnose the break-down, and stores them in the data base defined in memory 101 as vehicle information 102.

The service company, which assumes the consulting of the servicing to be a main business, possesses server computer 100, and receives the vehicle diagnosis data from a plurality of users' cars 104 to 107. The driver of the car corresponds to the member for the service company. The diagnosis data of the vehicle that each member has is received by public line 108 via Internet 103. Here, the counter measure concerning the servicing is transmitted by retrieving from the vehicle information data base 102 where a past diagnosis and the maintenance career data are stored in memory 101.

Controller 113 which consists of the traffic monitor camera 116 of the surrounding of radar 115 for the vehicular gap detection besides engine 118, brake 119, and change gear 117 and the car is installed in user's car 104 in figure. The vehicle diagnosis data from these controllers is collected by <bus> 114 in the vehicle and <security Gate Way (G/W)> 120 by abnormal data report system 121. Security Gate Way 120 is used as firewall to operate neither the engine nor the change gear, etc. mistake CAR NAVIGATION SYSTEM etc.

car navigation system 109 and cellular phone 111 are connected to each other by network 112. network 112 is a short distance wireless, for example, bluetooth etc. or it can be a cable network. The user interface between the car navigation system and the driver are performed through display 110.

FIG. 2 shows a configuration in the above-mentioned business model including a plurality of maintenance companies (maintenance agency). In the same way, maintenance companies 131 to 133 is connected to server computer 100 of server system 10 via public line 108 and Internet 103. maintenance company data base 130 exists in memory 101, and the feature of each maintenance company, the business day of a store, and the place, etc. are memorized.

FIG. 3 shows an example of bringing the vehicle diagnosis data from a plurality of members' cars together in vehicle information data base 102. In figure, 140 designates a member number and a member name, and 142 designates a manufacturing number of the car, and 147 designates factors to which the degree with the danger which becomes a running trouble at that time is shown careers of the judgment of the diagnosis maintenance result and the exchange parts 143,144,145 and 146 the where to make contact address 141. For instance, replenishment and each exchange is demanded in manufacturing number AAY9424678 of the member number 001 and the car due to the low coolant and the brake friction pad wear. In figure, only cooling water, engine oil, the brake friction pad, and the change gear have been described. However, information on these car components has the possibility for all part information which can be acquired through the network in the car etc. to be registered. Moreover, only the member name and the where to make contact address have been described as member information in figure, and it is also possible to register information on the own house telephone number, the office, and the office telephone number, etc. excluding this. Moreover, it can be assumed the composition by which the manufacturing maker, the parts manufacturing maker of the car, and information on the kind etc. of the car are added as vehicle information.

FIG. 4 shows the list to which vehicle information data base 102 is enhanced further. Not only latest information on the vehicle but also past information is registered in the data shown in this figure. Components 151,152,153,154 designate the name of parts, the exchanged date of the parts, the factor and the state, which broke down in the past, respectively. These data acquires breakdown calendar and accident calendar of pertinent vehicle Actually, a vehicle information data base 102 is composed by combining the data shown in FIG. 3 and the data shown in FIG. 4.

FIG. 5 shows maintenance company data base 130 among information related to the servicing stored in memory 101. the data of each region related to maintenance company is filed, and includes basic items such as name of the company 160, address 161, the closed day 162 and business hours 163, etc. and reference data for search such as features 164 and the like. When the vehicle breakdown occurs as described later, it is necessary to introduce the vicinity and maintenance company under sales. Therefore, basic data of business hours etc. is indispensable on the address and the closed day.

FIG. 6 shows the situation that warning 175 of an abnormal circulating water temperature by the above-mentioned low coolant is displayed on display 110. First of all, the data of abnormal circumstances is input to abnormal data detection routine 170 which exists in abnormal data reporting process 121 via security Gate Way 120. Here, an abnormal vehicle is informed from abnormal data notification routine 171 in the car on display 110, and transmitted to the service company by cellular phone 111 connected by short distance wireless network 112. In addition, abnormal data is memorized on memory card 173,174 by abnormal storing data routine 172. By installing two memory cards, one of two memory cards can be carried to the service company for the diagnosis in off-line mode. However, when these functions are not achieved, two memory cards are not necessarily needed.

To warn overheating of the engine, the water temperature gauge equipped normally is set from the report level of this embodiment to the high temperature. Therefore, attention is considerably required to usually run to maintenance company after warning is received. In contrast, because the abnormal warning level of this embodiment for the reporting setting level of the signal from the engine control sensor allows the driver to drive the vehicle safely, the driver may not be so anxious about driving. Moreover, a more precise break-down diagnosis can be done by informing, and recording data to which not only abnormal data but also the deterioration of parts is shown.

Figure 19:
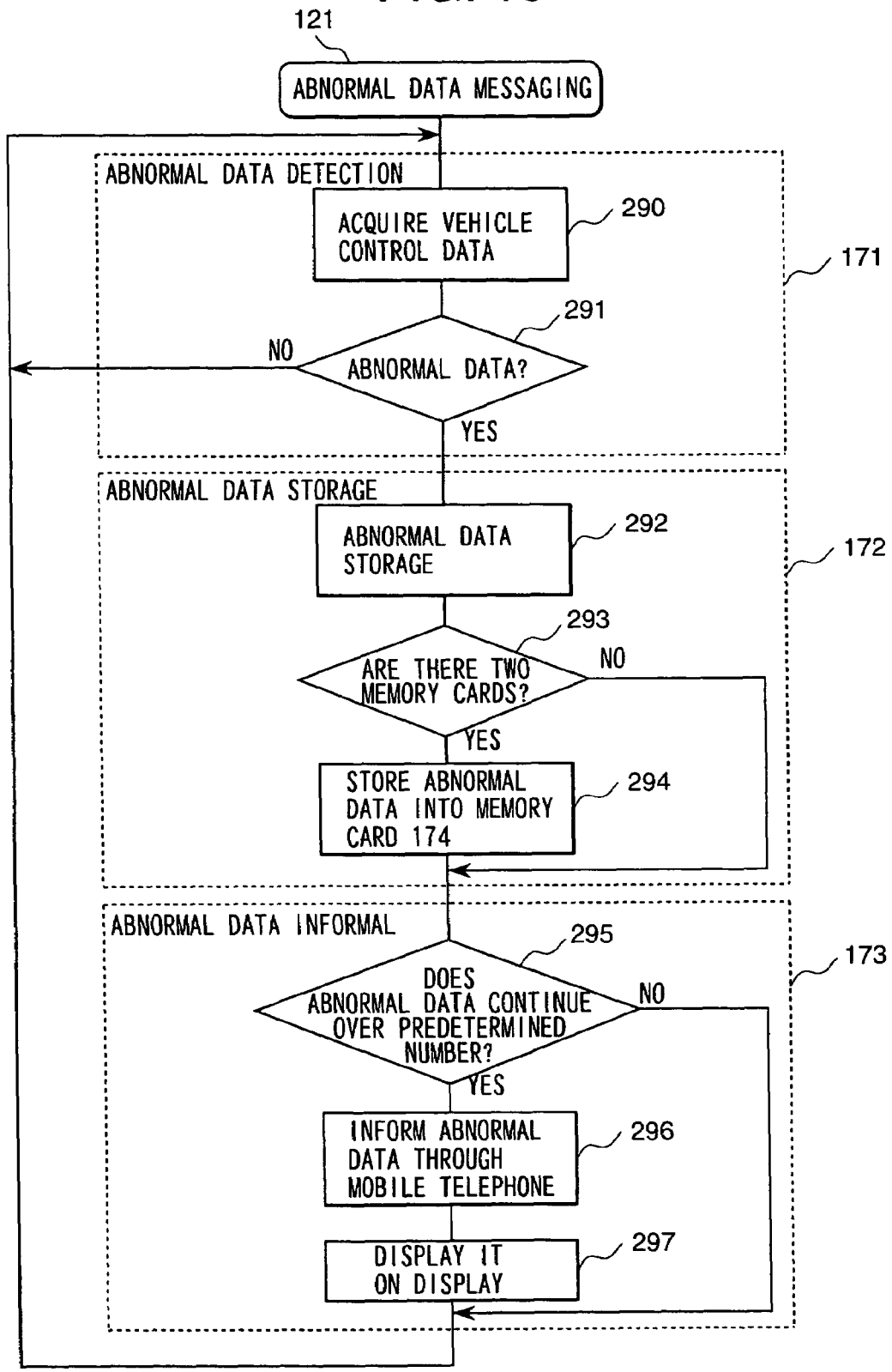
FIG. 19 shows the processing flow of abnormal data reporting process.

The content of the processing of above-mentioned abnormal data reporting process 121 is shown in FIG. 19. Abnormal data detection routine 171 acquires the vehicle diagnosis data from security Gate Way 120 (processing 290). It is checked whether this data is an abnormal value (processing 291), and if it is a normal value, the following processing is not performed. Abnormal storing data routine 172 stores the abnormal data on memory card 173 when judged that the vehicle diagnosis data is abnormal (processing 292). Here, the same data is stored on memory card 174 when it is checked whether two memory cards exist (processing 293), and exists by two pieces (processing 294). As a result, the data of memory cards 173 and 174 can be always synchronized.

Here, it is checked whether processing 295 has continuously generated abnormal data. Abnormal data notification routine 173 does not inform of abnormal data by thinking a transitory noise when abnormal data is not continuously generated. It is considered that the possibility of the breakdown generation is high at abnormal data successive generation, and notifies the service company abnormal data through the cellular phone (processing 296). Abnormal state is displayed on the display with this (processing 297).

According to the above described structure, what can be provided is an on-vehicle breakdown-warning report system, comprising an abnormal data detection apparatus for detecting an abnormal data based on a control data in a designated operation condition for component parts forming a control system including powertrain control and vehicle control and a control data in an ordinary operation condition;

an on-vehicle mobile data communication terminal;

an on-vehicle panel for accepting an abnormal data from said mobile data communication terminal and displaying a diagnostic result based on an abnormal data for said individual component parts of said control system; and a maintenance information acquisition apparatus for, when a component part is specified on said on-vehicle panel, sending a control data or an diagnostic data for said component part, requesting a maintenance information to a maintenance agency outside a vehicle, and acquiring a maintenance information from said maintenance agency.

In addition, what can be provided is an on-vehicle breakdown-warning report system, comprising: a break-down diagnosis apparatus for outputting a diagnostic result based a control data in a designated operation condition for a control system including powertrain control and vehicle control and a control data in an ordinary operation condition; an on-vehicle panel for displaying a diagnostic result by said break-down diagnosis apparatus for individual component parts of said control system; and a memory apparatus for storing a control data for individual component parts, or a diagnostic data as a diagnostic result obtained by comparing said control data with an allowable zone; an on-vehicle mobile data communication terminal; a vehicle maintenance selection apparatus, comprising a maintenance information acquisition apparatus for, when a component part is specified on said on-vehicle panel, sending a control data or an diagnostic data for said component part, requesting a maintenance information and an estimate for charge required for inspection and maintenance work to plural maintenance agencies outside a vehicle, and acquiring a maintenance information individually from said plural maintenance agencies, for displaying acquired plural maintenance information and estimation information, and for allowing a user to select a maintenance agency to which a maintenance work is ordered based displayed maintenance information and estimation information.

In addition, what can be provided is a vehicle breakdown-warning report system, having a vehicle maintenance information apparatus comprising: a break-down diagnosis apparatus for outputting a diagnostic result for a control system including powertrain control and vehicle control; an on-vehicle panel for displaying a diagnostic result; an on-vehicle mobile data communication terminal apparatus; and a maintenance information acquisition apparatus for sending a diagnostic result through said mobile data communication terminal apparatus, and for sending a request for maintenance information and a request for an estimate of maintenance work to a maintenance agency, wherein said vehicle maintenance information apparatus acquires an answer for maintenance information and estimation information requested from said mobile data communication terminal apparatus and obtained from plural maintenance information service terminals of plural maintenance agencies, and allows a user to order a maintenance work to a selected maintenance agency.

Figure 7:
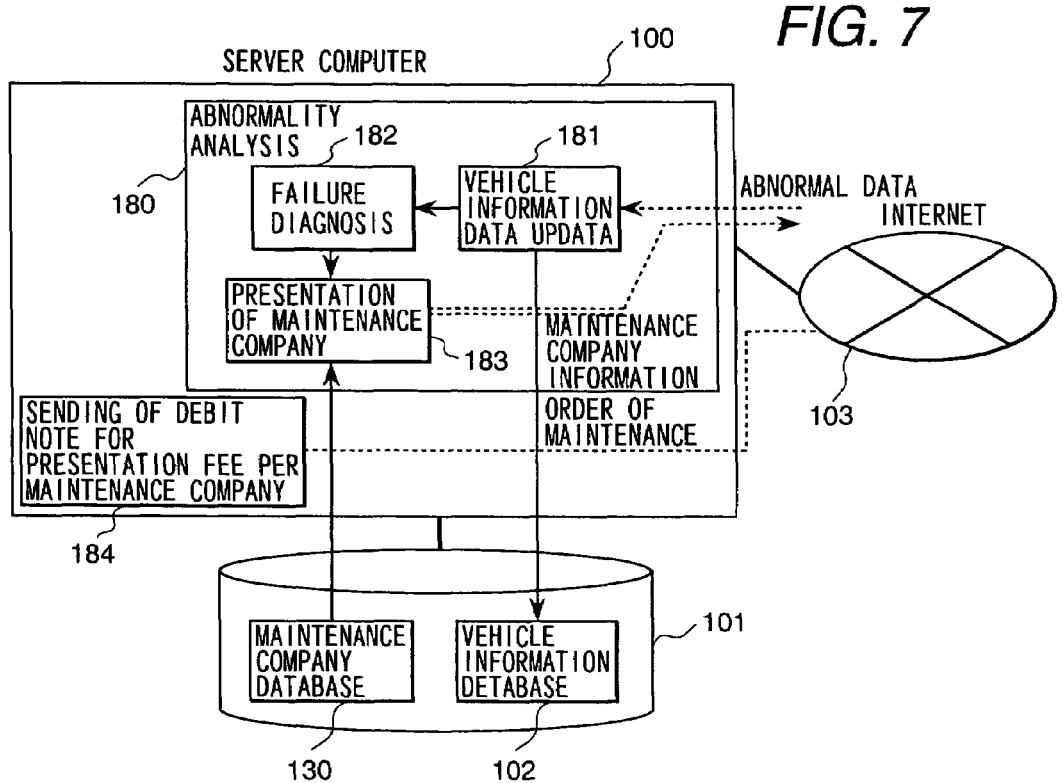
FIG. 7 shows a configuration of the procedure by which the maintenance company list is notified the order ahead is shown as the server computer estimates the charges for p art procurement, exchange and the servicing are compared according to break-down information received from the user.

FIG. 7 shows a configuration to which the processing process of the service company which received abnormal data. That is, what is shown is the procedure for determining an optimal selection for the user with which the service company can be selected for the servicing, the part procurement, and the part replacement with an optimal charge, according to the break-down information sent by the user. First of all, when abnormal data is received by way of the Internet 103, abnormal, analytical process 180 is started. Here, the received abnormal data is written in vehicle information data base 102 and vehicle information data update routine 181 is added. Break-down diagnosis routine 182 does the vehicle break-down diagnosis by using abnormal data, and maintenance company introduction routine 183 selects an optimum maintenance company from the maintenance company data base 130 with respect to parts procurement, exchange and inspection service quality and provides it to the user. Maintenance company of best is selecting introduced from maintenance company data base 130 (Including the part procurement and the exchange check) to the user. In case that there are plural service companies to be judged to be optimum, those are listed in a maintenance service company list and presented to the user. The number of selected maintenance service company is ordinary one, but it is allowed to list up 2 or more companies. The number of selected maintenance company is generally one, but it may be 2 or more. The service company performs the break-down diagnosis and introduces the maintenance company on the server computer 100, and stores the resultant data separately into the vehicle information data base 102 and the maintenance company data base 130 in the memory 101. To receive the commission from maintenance company with the user by the pretext of the maintenance fee and the introduction fee, the service company executes introduction fee claim process 184 according to maintenance company.

Figure 20:
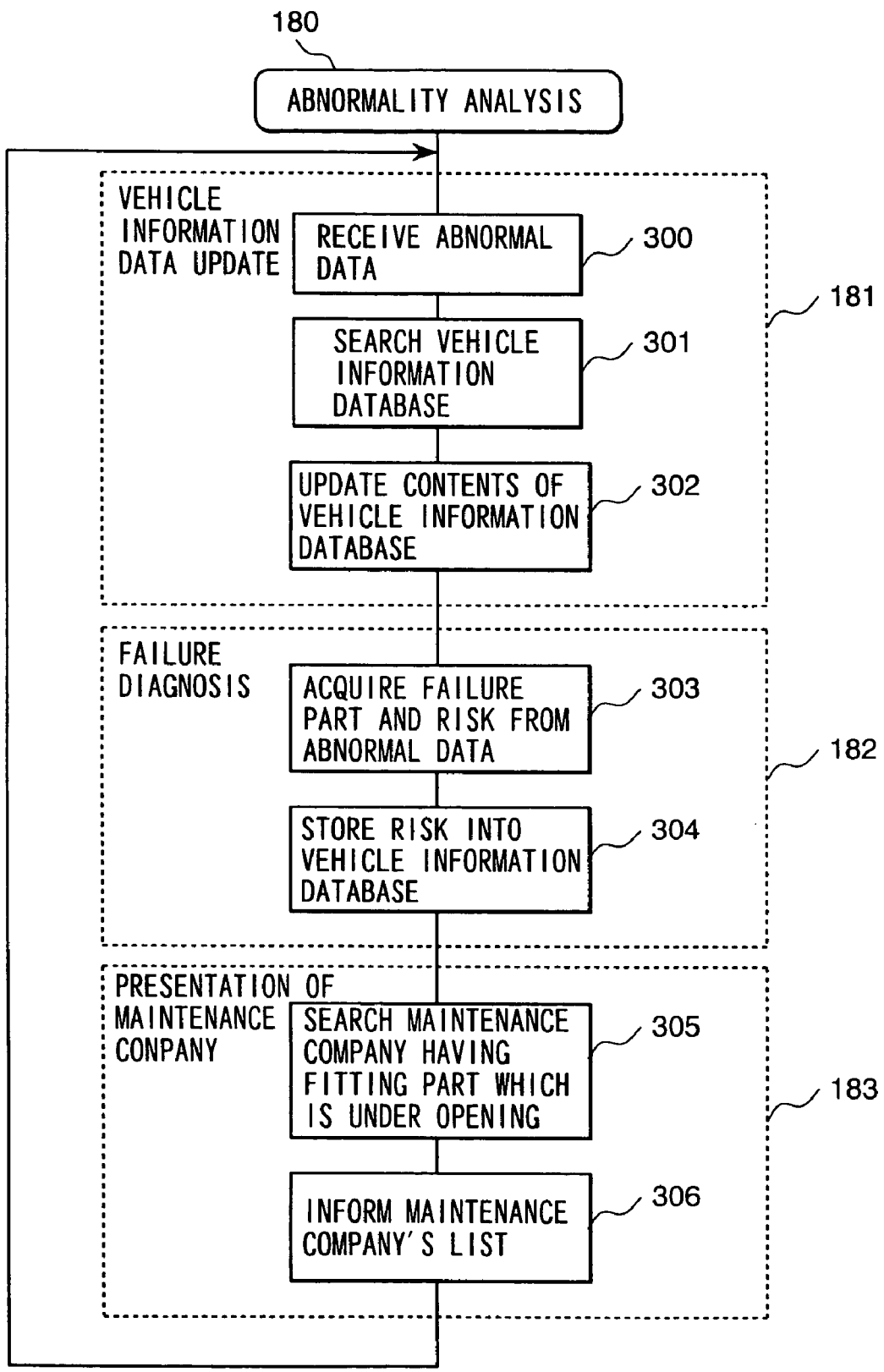
FIG. 20 shows the processing flow of an abnormality analysis process.

The processing flow of abnormal analysis process 180 is shown in FIG. 20. Vehicle information data update routine 181 receives abnormal data to prime through the Internet (processing 300), and, next, the corresponding vehicle data of the vehicle information data base is retrieved (processing 301). The received abnormal data is stored at the position where the vehicle information data base is retrieved (processing 302).

Break-down diagnosis routine 182 continuously calculates the risk of a locating fault and a pertinent breakdown from the acquired abnormal data and acquisition by last time, and the career data of the each parts stored in the vehicle information data base (processing 303). The obtained risk is stored in the vehicle information data base (processing 304). Next, maintenance company introduction routine 183 retrieves maintenance company which can maintain a pertinent breakdown by processing 305. Maintenance company possesses parts to repair a pertinent breakdown, exists in outskirts of the car, and should be business hours. Those data is notified to the car as a list when a plurality of corresponding maintenance company exists (processing 306). There are a charge system etc. when the servicing is done to the name of maintenance company and another in the address etc. by concerned maintenance company as notified data.

Figure 21:
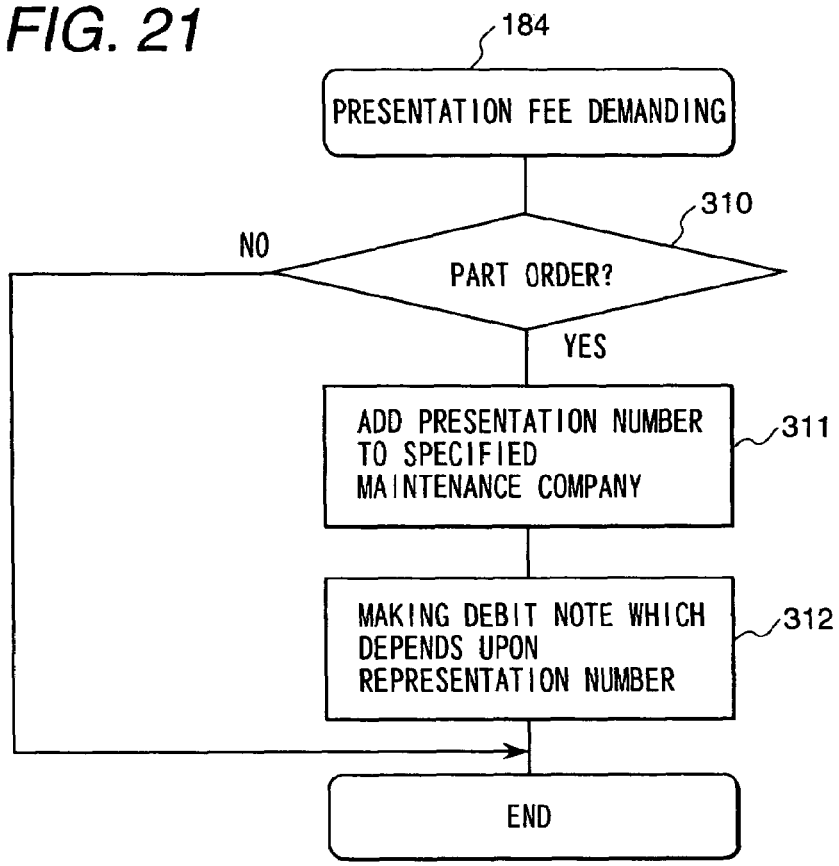
FIG. 21 shows the processing flow of the introduction fee claim process according to maintenance company.

The processing flow of introduction fee claim process 184 according to maintenance company is shown in FIG. 21. When the user repairs oneself though maintenance company was introduced, parts might not be ordered.

Therefore, when it is checked whether the part order was done in processing 310, and is done the order, the introduction number to correspondences maintenance company is added (processing 311). The invoice corresponding to the introduction number is made according to the timing such as end of the month (processing 312), and the commission is received.

Figure 8:
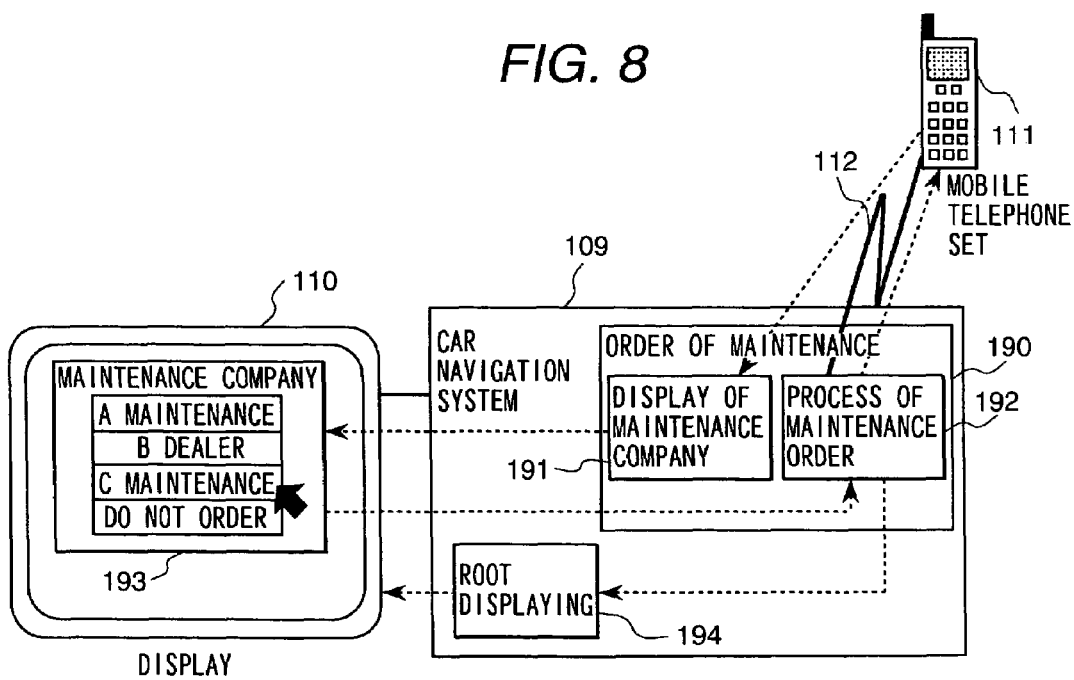
FIG. 8 shows an example of maintenance company candidate list received from the service company by the user with his or her cellular phone.
Figure 9:
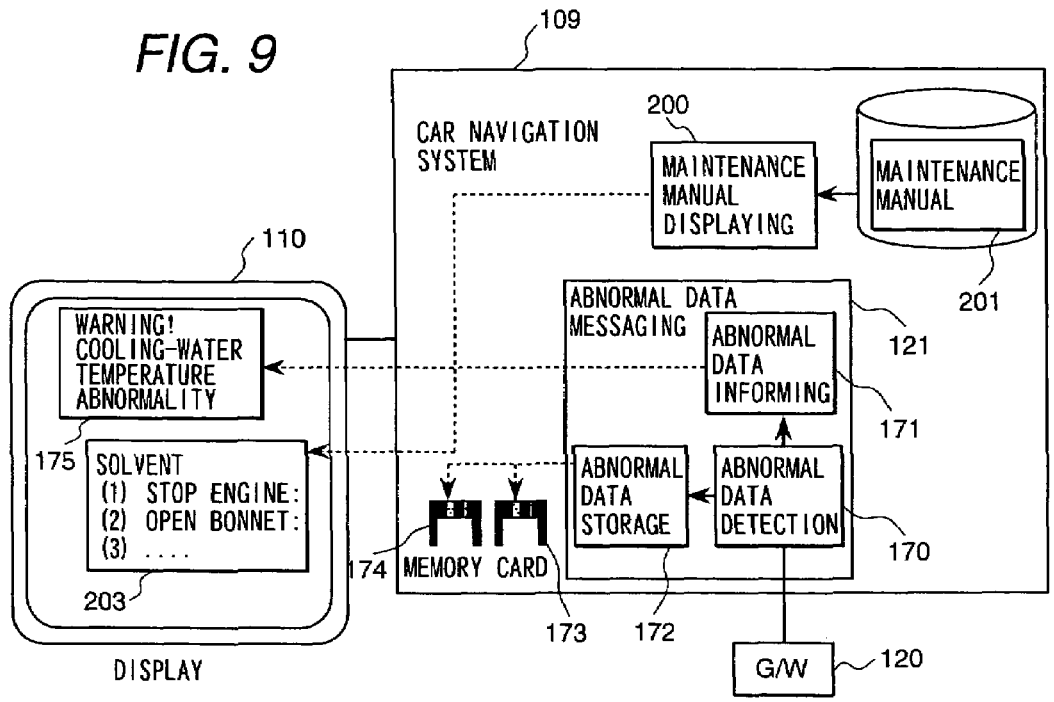
FIG. 9 shows a configuration of the procedure for displaying the maintenance manual on the on-vehicle screen in response to the circulating water temperature abnormality report, and the procedure for inspection and exchange of the sensor for the thermometer by the user or maintenance company.

FIG. 8 is an example of operating car navigation system when the user receives the maintenance company candidate list from the service company by the cellular phone the order ahead. At this time, maintenance order process 190 is started. When the user receives the maintenance company candidate list from the service company through cellular phone 111 and short distance wireless network 112 the order ahead, maintenance company display routine 191 displays maintenance company list 193 on display 110. The mechanic scene map is transmitted from maintenance order processing routine 192 to route display process 194 when the user selects maintenance company ordering ahead from display 110, and the running route to maintenance company is displayed. Route display process 194 can use the function installed in general car navigation system. The work schedule, the loaner car specification, and estimation can be displayed on display 110 simultaneously with the route to maintenance company.

Figure 22:
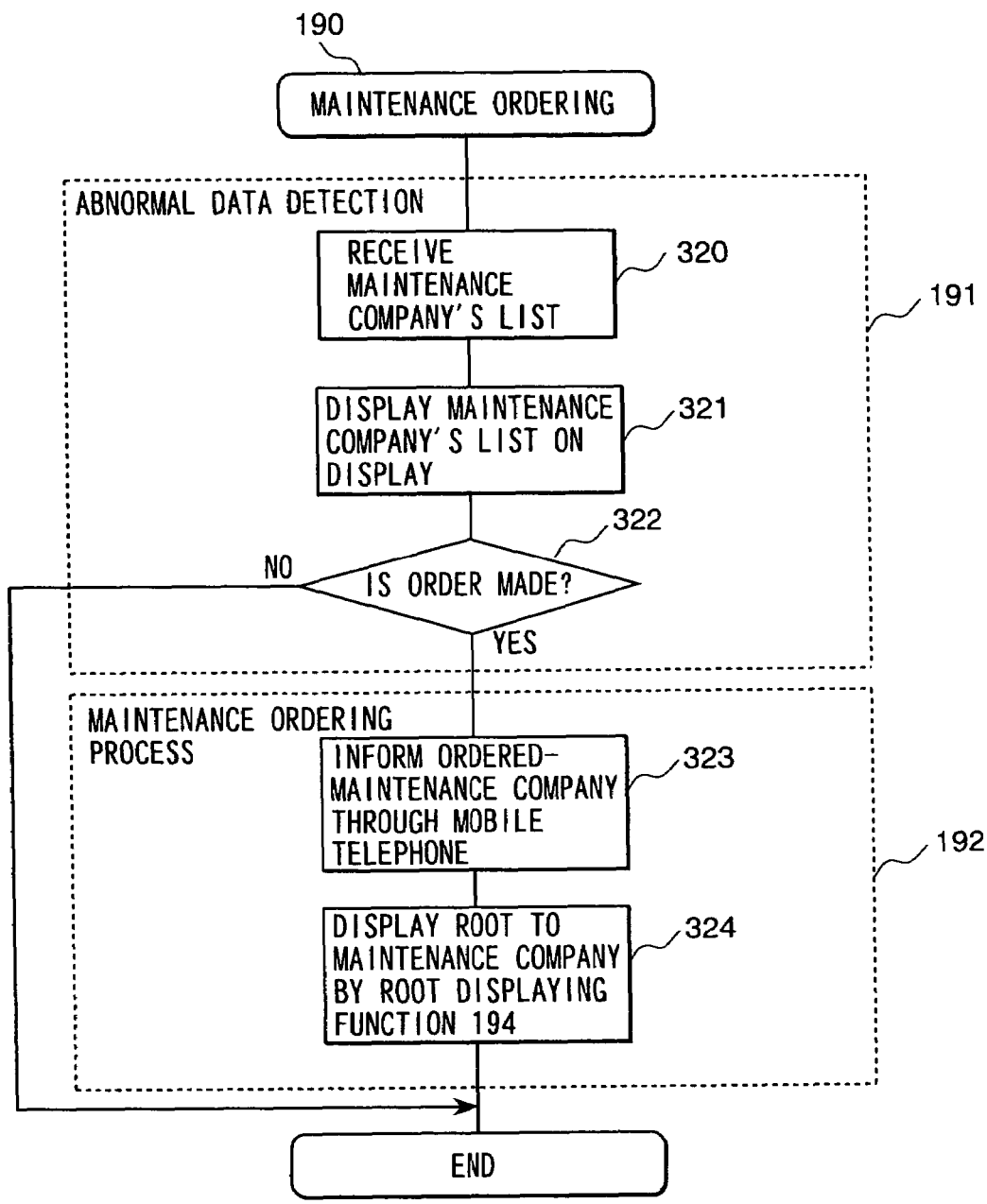
FIG. 22 shows the processing flow of the maintenance order process.

The processing flow of maintenance order process 190 was shown in FIG. 22. The maintenance company list is received from the server computer to prime by maintenance company display routine 191 (processing 320). Next, the received maintenance company list is displayed on the display (processing 321), and the user is requested to answer whether he or she goes further to the parts ordering step (processing 322). Maintenance orders processing routine 192 notifies maintenance company ordering ahead through the cellular phone when the user orders (processing 323). Moreover, this routine 192 displays the route to correspondence maintenance company by using the function of car navigation system (to the display)(processing 324). When the user does not order, this procedure is escaped without any processing executed.

The explanation concerning a first embodiment of the present invention is finished above. The feature of this embodiment is in the prompt recognition of the vehicle breakdown (The breakdown car) by managing diagnosis information on the car with the server computer, and can the lead into maintenance company of outskirts. Moreover, the user can select best maintenance company for me by not only choices of only maintenance company but also showing plurality of choices as mentioned above.

Next, the second embodiment of the present invention is explained. The same composition as a first embodiment is not repeatedly explained. A first embodiment diagnosed the vehicle breakdown with the server computer which existed remotely. The second embodiment supports the vehicle maintenance which the user of the car does oneself. This embodiment corresponds again in a first embodiment when maintenance company ordering ahead is not selected.

FIG. 8 is a system configuration chart where maintenance manual for the user to recover a pertinent breakdown corresponding to the vehicle breakdown was installed. In the memory of car navigation system 109, vehicle maintenance manual 201 is installed. Maintenance manual display process 200 takes out the repair manual corresponding to the vehicle breakdown when abnormal data reporting process 121 detects the vehicle breakdown, and repair method screen 203 is displayed on display 110. In the example of figure, the repair method screen 203 is displayed on display 110 in response to the circulating water temperature abnormality report, and the procedure by which the maintenance person of the user or maintenance company does the check exchange of the thermometer sensor is shown.

Figure 23:
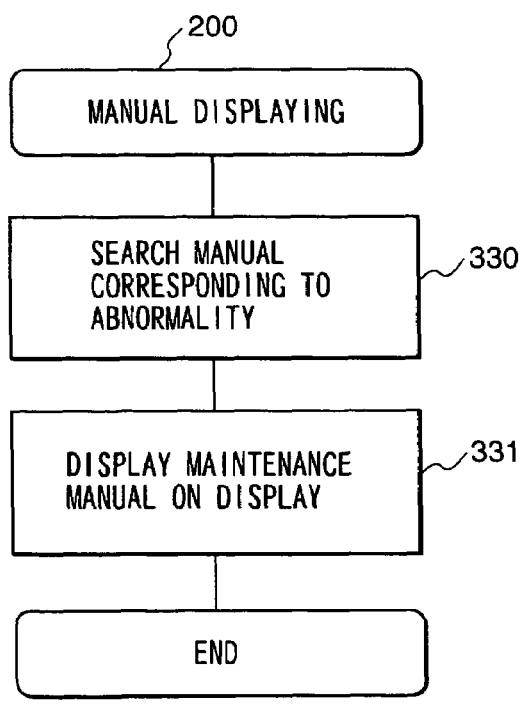
FIG. 23 shows the processing flow of maintenance manual display process.

The processing flow of maintenance manual display process 200 was shown in FIG. 23. At first, the repair manual corresponding to the found abnormally is retrieved and acquired from maintenance manual (processing 330) and, next, the method of repairing a pertinent breakdown is displayed on the display (processing 331).

The user or the maintenance person of maintenance company can support the procedure by which the maintenance and repair of the vehicle is done directly by this embodiment.

It is necessary to install maintenance manual in car navigation system in the second embodiment. Therefore, the problem that the memory capacity which car navigation system needs grows is considered. Maintenance manual also achieves the method downloaded from the server computer in the third embodiment which shows from now on by the cellular phone, public line or the Internet. As a result, maintenance manual need not be installed in car navigation system, and it is possible to reduce in the memory capacity.

Figure 10:
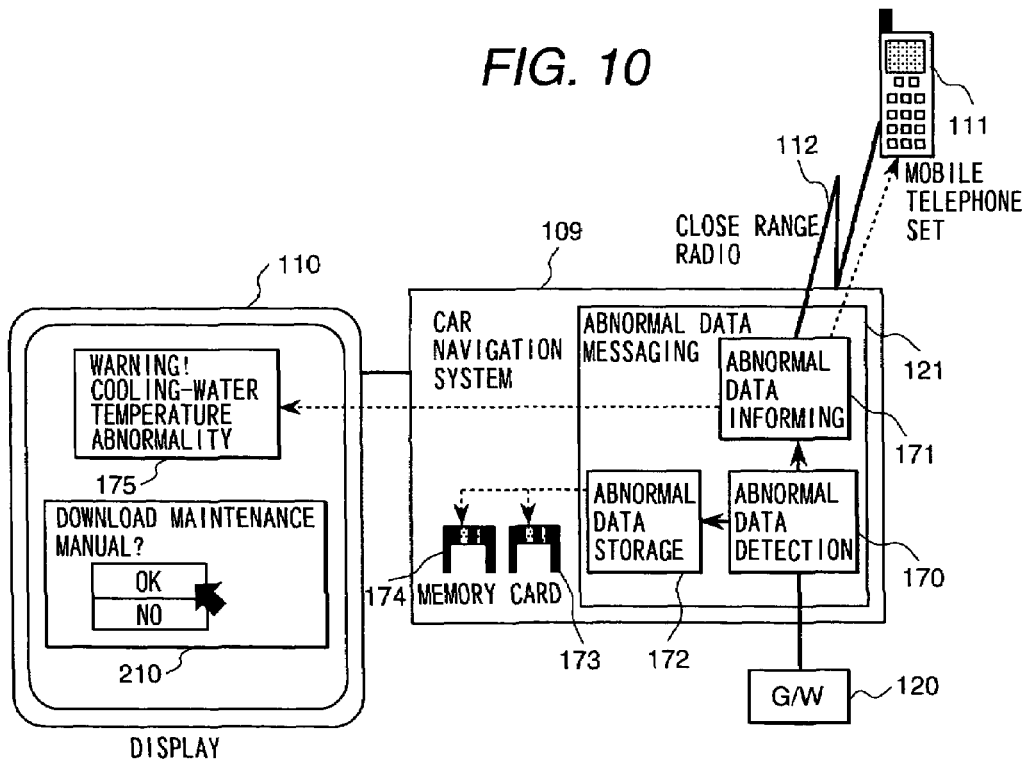
FIG. 10 shows a configuration of the procedure by which the maintenance manual is downloaded in response to the circulating water temperature abnormality report.

FIG. 10 shows the on-vehicle system configuration chart when the third embodiment is selected. The function in car navigation system is the same as a first embodiment. Down-loading selection screen 210 is displayed on display 110 in figure. When breaking down, maintenance manual which corresponds to a pertinent breakdown can be downloaded by selecting OK on this screen. The down-loading demand is notified to the server computer through abnormal data reporting process 121 and cellular phone 111.

Figure 11:
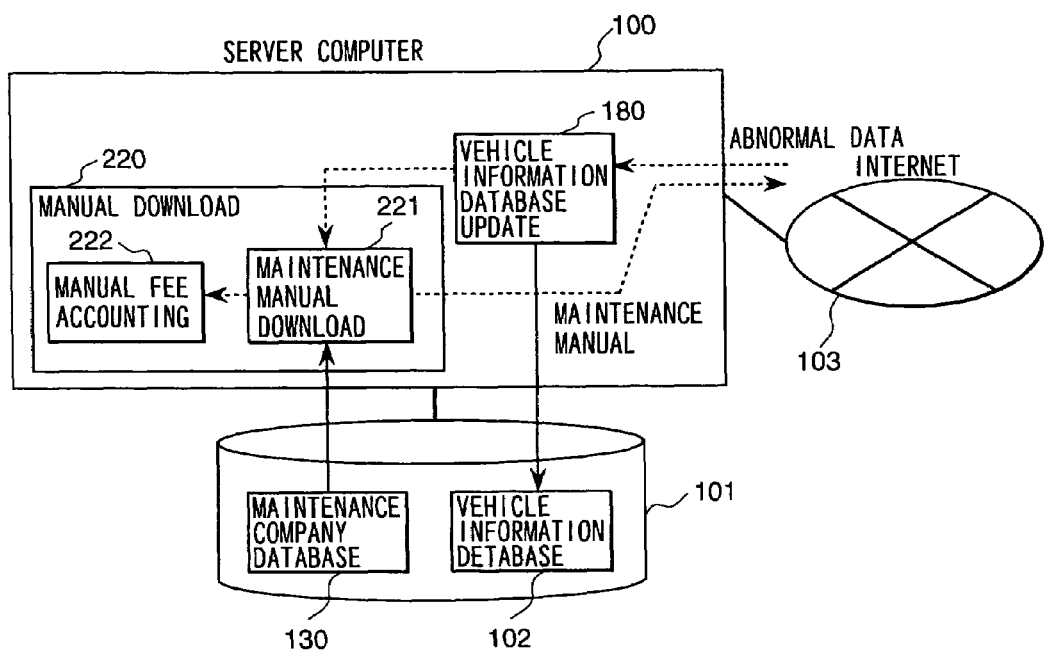
FIG. 11 shows a configuration of the procedure by which the service company notifies the manual in response to the maintenance manual down-loading demand.

FIG. 11 shows the operation of the server computer 100 when receiving the down-loading request for the maintenance manual. In maintenance manual download process 220, maintenance manual download routine 221 and manual charge accounting routine 222 exist. The repair manual corresponding to abnormality is cut out in maintenance manual 201 which exists in memory 101, and maintenance manual download routine 221 is notified to the car where the breakdown occurs by Internet 103. It is necessary to impose the charge corresponding to the use frequency on the manual user, and manual charge accounting program 222 is a program which calculates this use charge.

Figure 24:
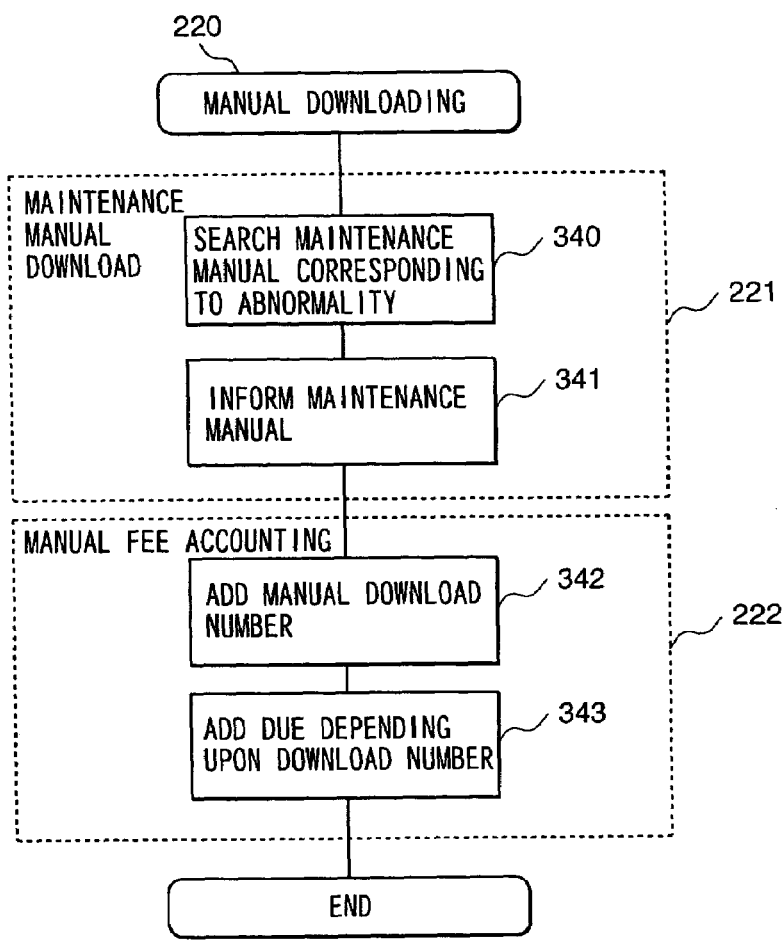
FIG. 24 shows the processing flow of maintenance manual download process.

The processing flow of maintenance manual download process 220 is shown in FIG. 24. Maintenance manual download routine 221 retrieves the repair manual which corresponds abnormally to prime (processing 340), and, next, notifies the breakdown car the repair manual retrieved through the Internet (processing 341). Manual charge accounting routine 222 adds the manual down-loading frequency of the owner of the breakdown car (processing 342), and collects the charge according to the manual down-loading frequency at the end (processing 343). Can the invoice be newly issued or the manual charge be collected by the method of the addition to the member charge etc.

Figure 12:
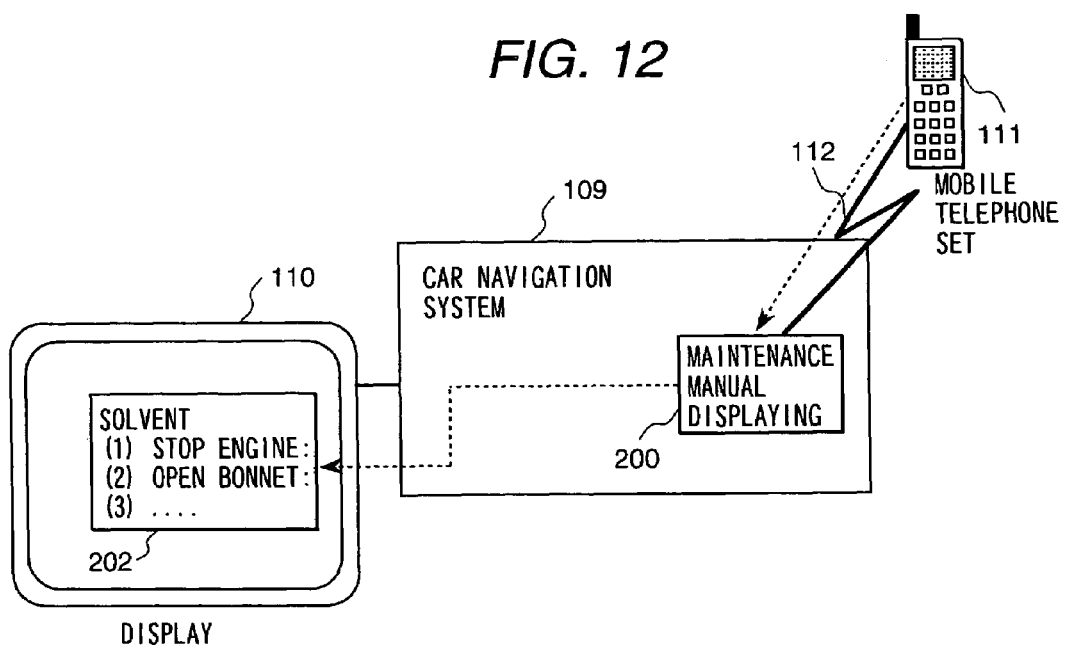
FIG. 12 shows an example of displaying downloaded maintenance manual.

FIG. 12 shows the data flow on the breakdown car after maintenance manual is actually notified. Repair method screen 202 which maintenance manual display process 200 accepted from cellular phone 111 is displayed on display 110.

Next, the fourth embodiment to diagnose abnormal state of the car by off-line is explained. An abnormal value of the vehicle control data is stored on memory card 173,174 as shown by a first embodiment. At this point, other memory card 174 is taken out, and can be sent to the service company. The car can run straight even if one memory card is sent, and a new, abnormal data keeps being stored on the other memory card.

Figure 13:
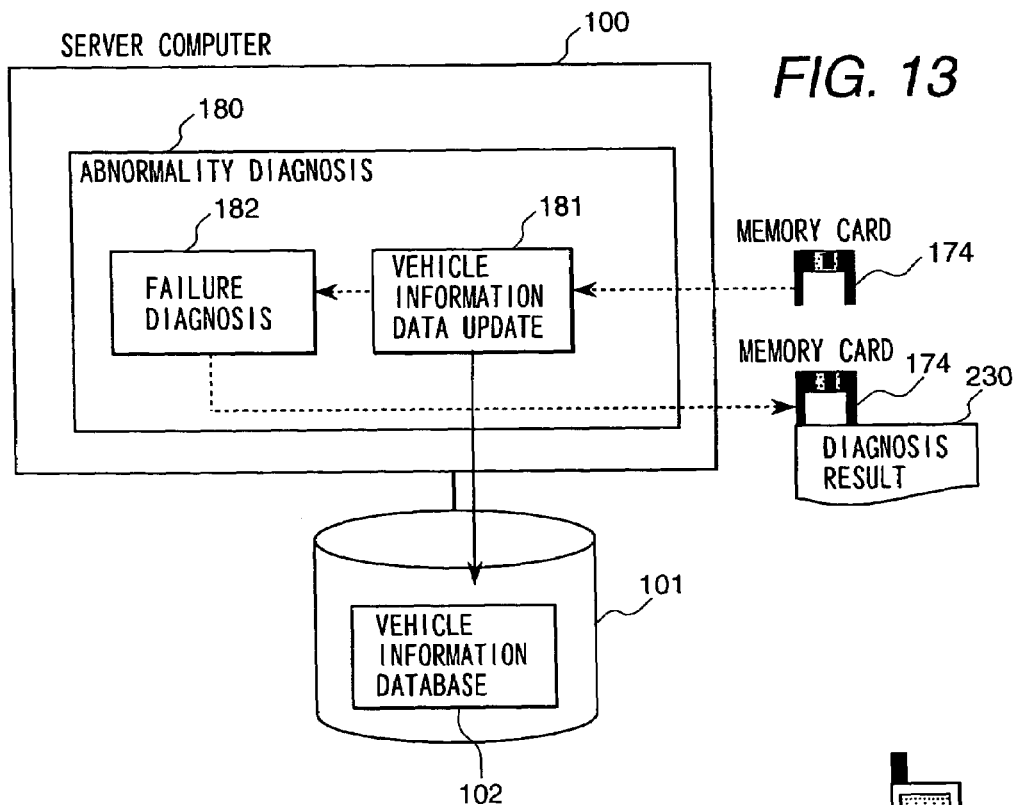
FIG. 13 shows a configuration of the procedure for off-line diagnosis of vehicles.

The embodiment diagnosed by off-line is shown in FIG. 13 by using other memory card 174. Vehicle information data update routine 181 and break-down diagnosis routine 182 in abnormal, analytical process 180 are the same as a first embodiment. These read directly, and diagnose the break-down in memory card 174 of abnormal data. The car user returns diagnosis result 230 with memory card 174.

Figure 14:
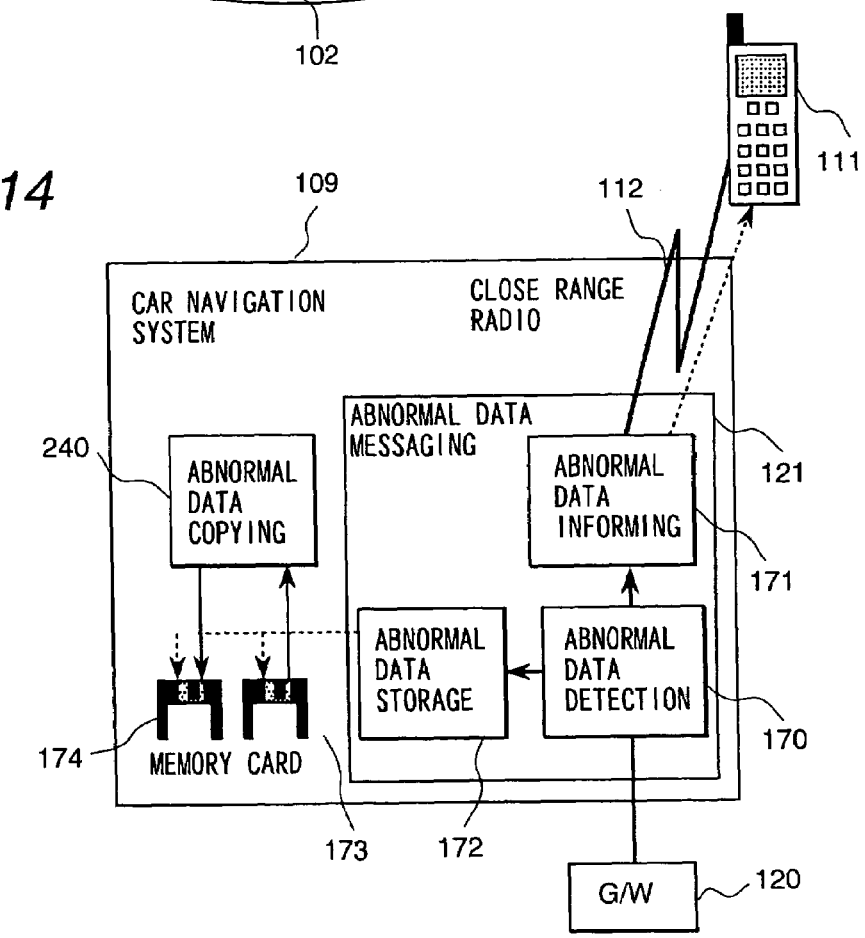
FIG. 14 shows the processing of the data synchronization when the memory card is inserted again.

Returned memory card 174 is installed in the vehicle again, and stores abnormal data. The example of inserting memory card 174 again is shown in FIG. 14. Here, there is a possibility that a new, abnormal data is stored on memory card 173 while memory card 174 is being detached. Therefore, the data copy is executed in this case by abnormal data copy process's 240 being started between two memory cards. As a result, the coherence of data between two memory cards comes to be achieved again.

Figure 25:
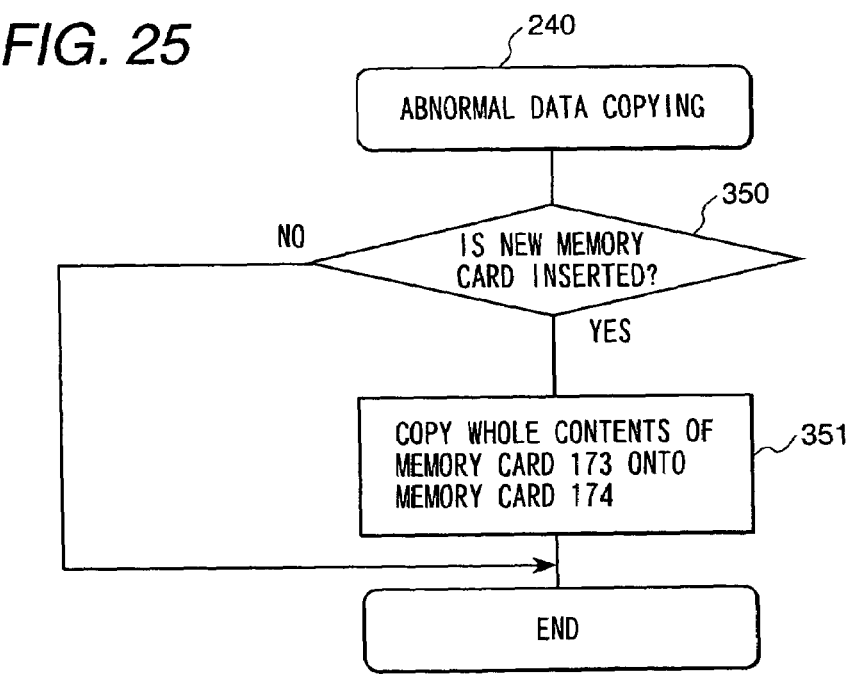
FIG. 25 shows the processing flow of the abnormal data copy process.

FIG. 25 shows the processing flow of abnormal data copy process 240. In a process concerned, the content of memory card 173 is copied onto memory card 174 only when it is checked whether the memory card was newly inserted (processing 350), and is inserted (processing 351).

It is also possible to achieve the fifth embodiment by which the used car is assessed by applying the fourth embodiment.

Figure 15:
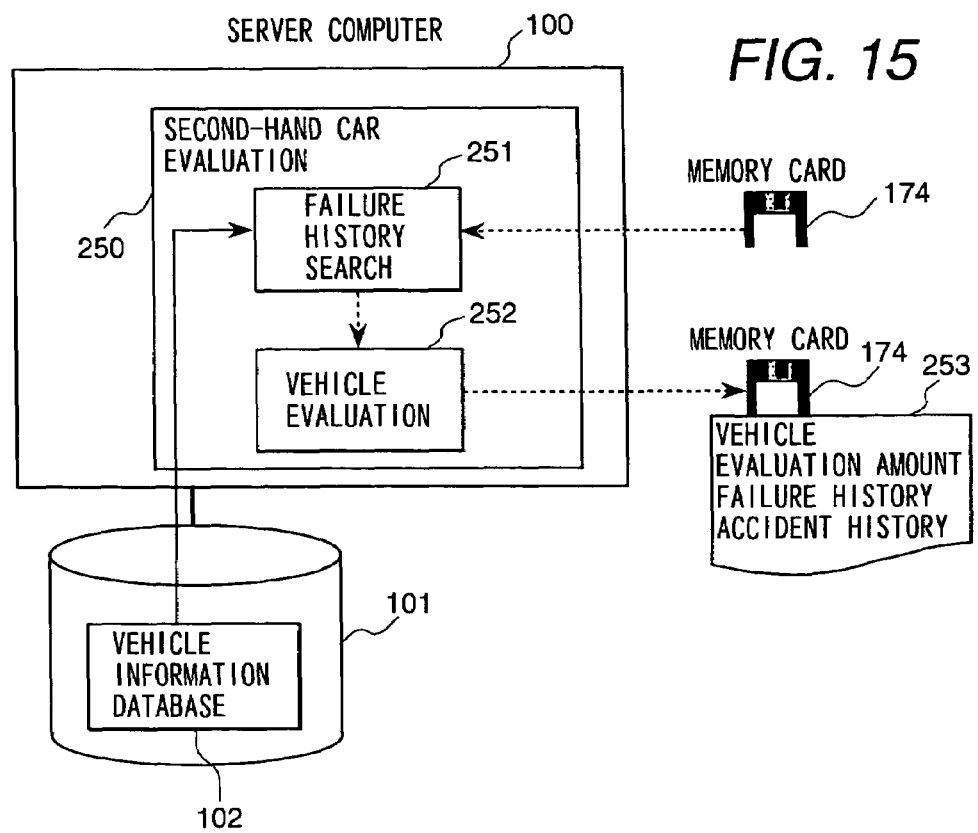
FIG. 15 shows a configuration of procedures for estimating the trade-in price of the used car.

The example of composing the server computer when the used car assessment business was done to FIG. 15 was shown. Obtaining memory card 174 or the vehicle number starts used car assessment process 250. Breakdown calendar retrieval routine 251 retrieves the breakdown calendar and the accident calendar of the vehicle from data or the vehicle number in the memory card. Vehicle assessment routine 252 outputs the amount of money of the assessment of a pertinent car by using these vehicle careers.

Those who request the assessment return assessment data 253 to which the amount of money of the assessment, the breakdown calendar, and the accident calendar, etc. are shown with the memory card.

Figure 26:
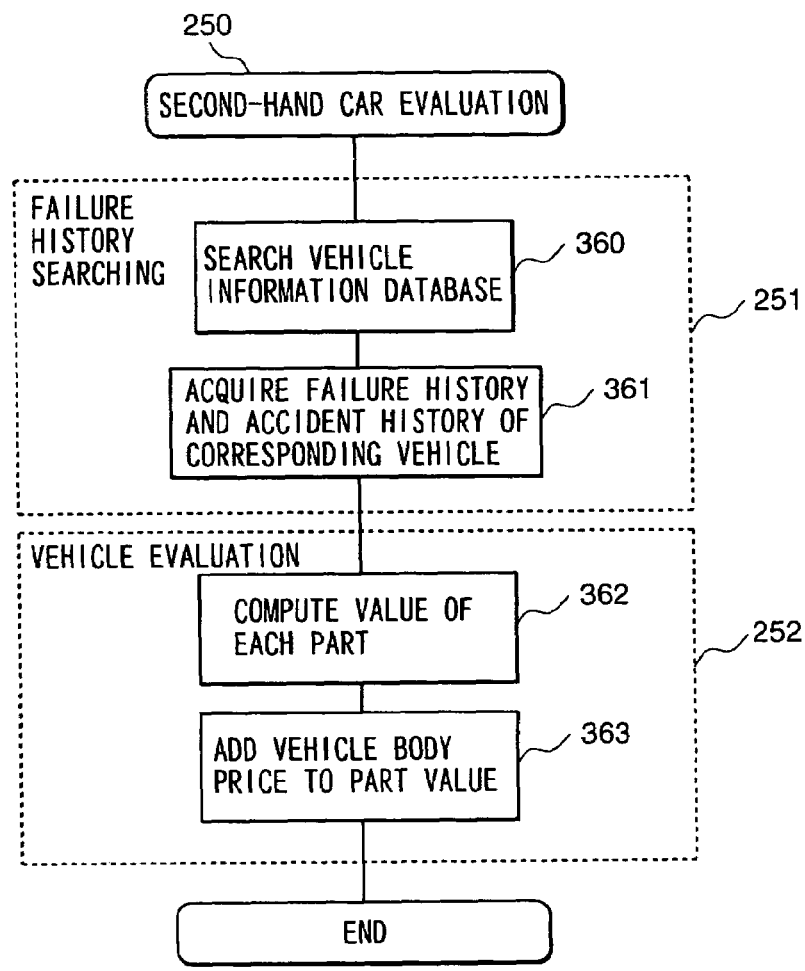
FIG. 26 shows the processing flow of the used car assessment process.

The processing flow of used car assessment process 250 was shown in FIG. 26. Breakdown calendar retrieval routine 251 retrieves data, corresponding to a pertinent vehicle from the vehicle information data base to prime (processing 360), and, next, acquires the breakdown calendar of a pertinent vehicle and the accident calendar (processing 361). Vehicle assessment routine 252 calculates the value of each parts (processing 362), adds the price of the main body of the vehicle calculated in the price with premium and the production fiscal year, etc. finally, and derives the assessment result (processing 363).

Figure 16:
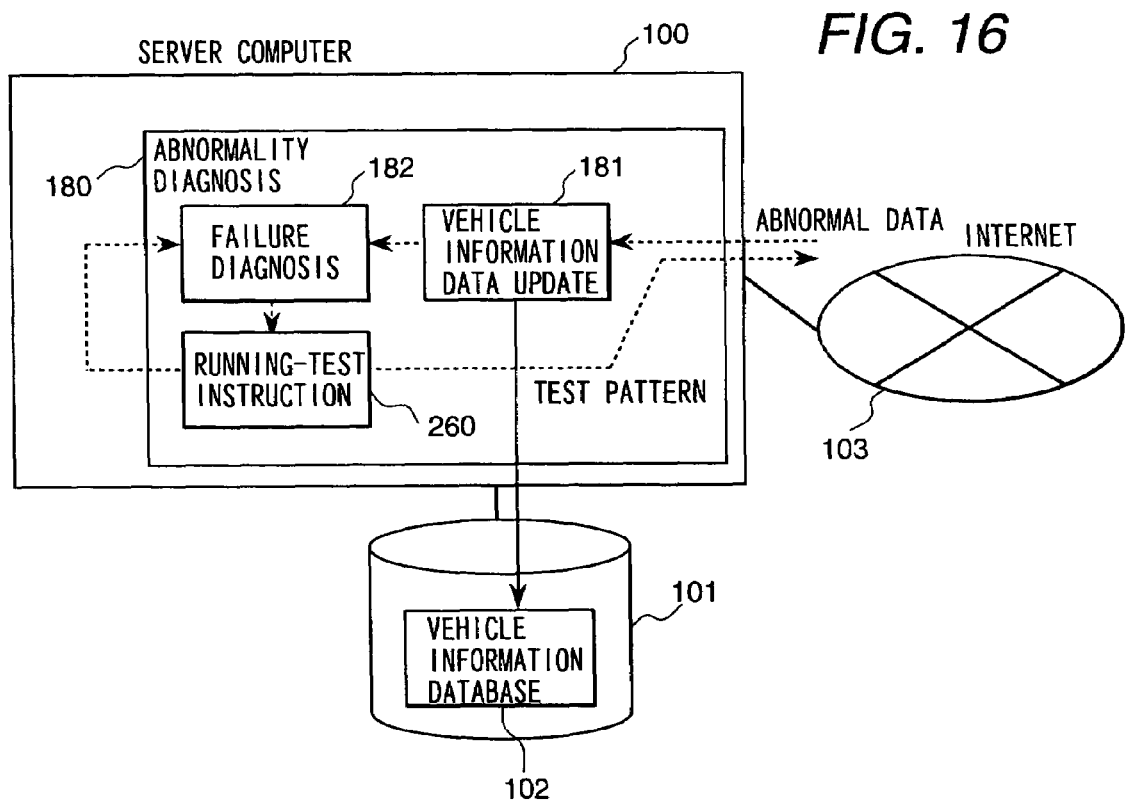
FIG. 16 shows a configuration of procedures for vehicle abnormality analysis when doing an elaborate break-down diagnosis.

Next, the sixth embodiment by which the accuracy of the break-down diagnosis is improved adding the improvement to a first embodiment is explained. FIG. 16 is a configuration of server computer 100 which composes the sixth embodiment. Running test instructin routine 260 is newly established in abnormal, analytical process 180 in this embodiment. Running test instructin routine 260 is a processing program which directs the running test pattern by which necessary data can be acquired when break-down diagnosis routine 182 cannot uniquely diagnose the breakdown.

Figure 27:
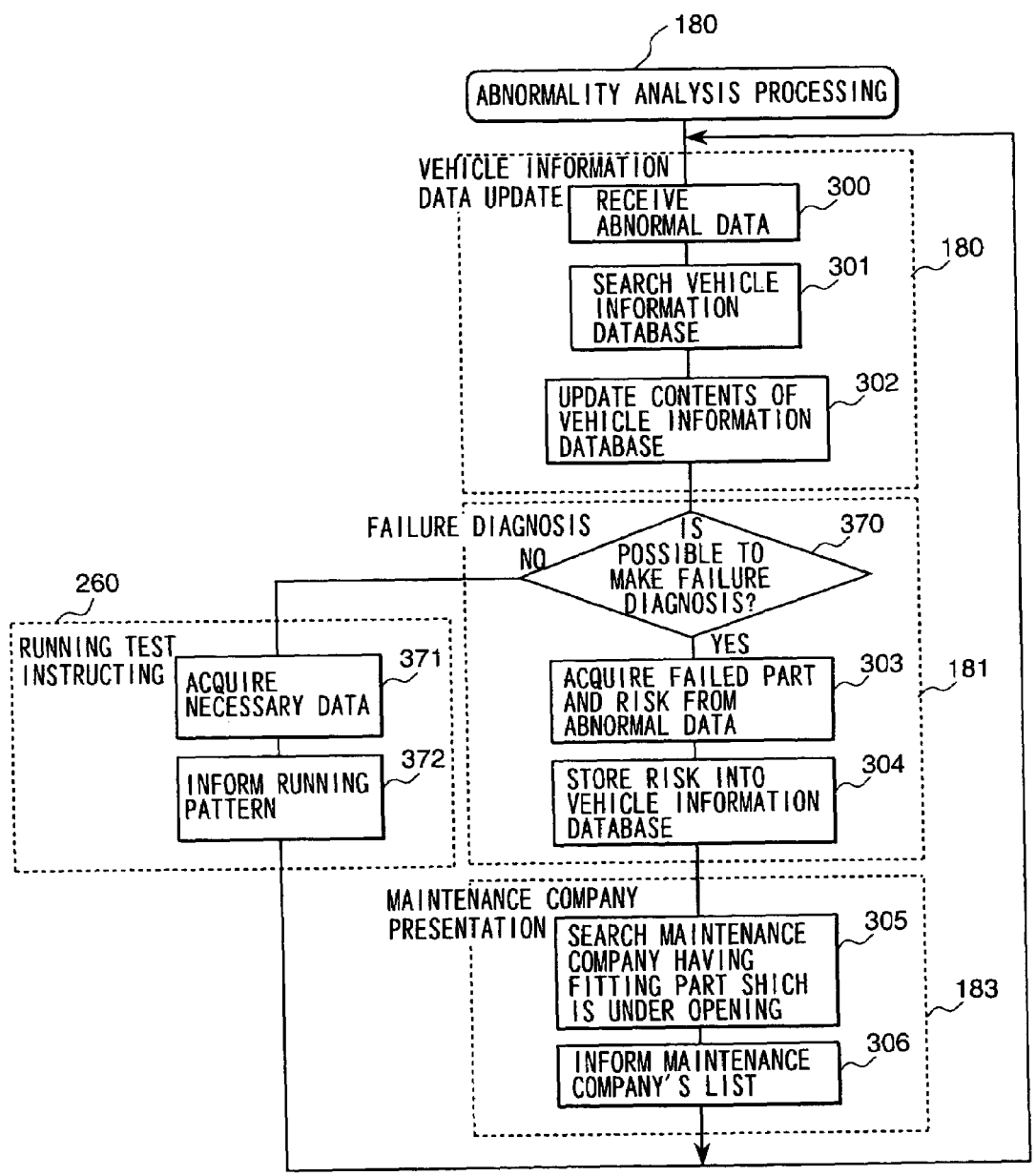
FIG. 27 shows the processing flow of an abnormality analysis process when an elaborate break-down diagnosis is done.

The processing flow of abnormal, analytical process 180 by which running test instructin routine 260 is installed is shown in FIG. 27. From processing 300 to the same processing 306 as first embodiment (FIG. 20) Processing 370 is inserted in break-down diagnosis routine 181, and it is checked whether the break-down diagnosis is possible according to the acquired abnormal data. If it is possible to diagnose the break-down, the same processing as a first embodiment is done. When the break-down diagnosis is impossible, running test instructin routine 260 is started, and running pattern for acquiring the data necessary to diagnose is calculated (processing 371). Next, the calculated running test pattern is notified to the breaddown vehicle (processing 372).

Figure 17:
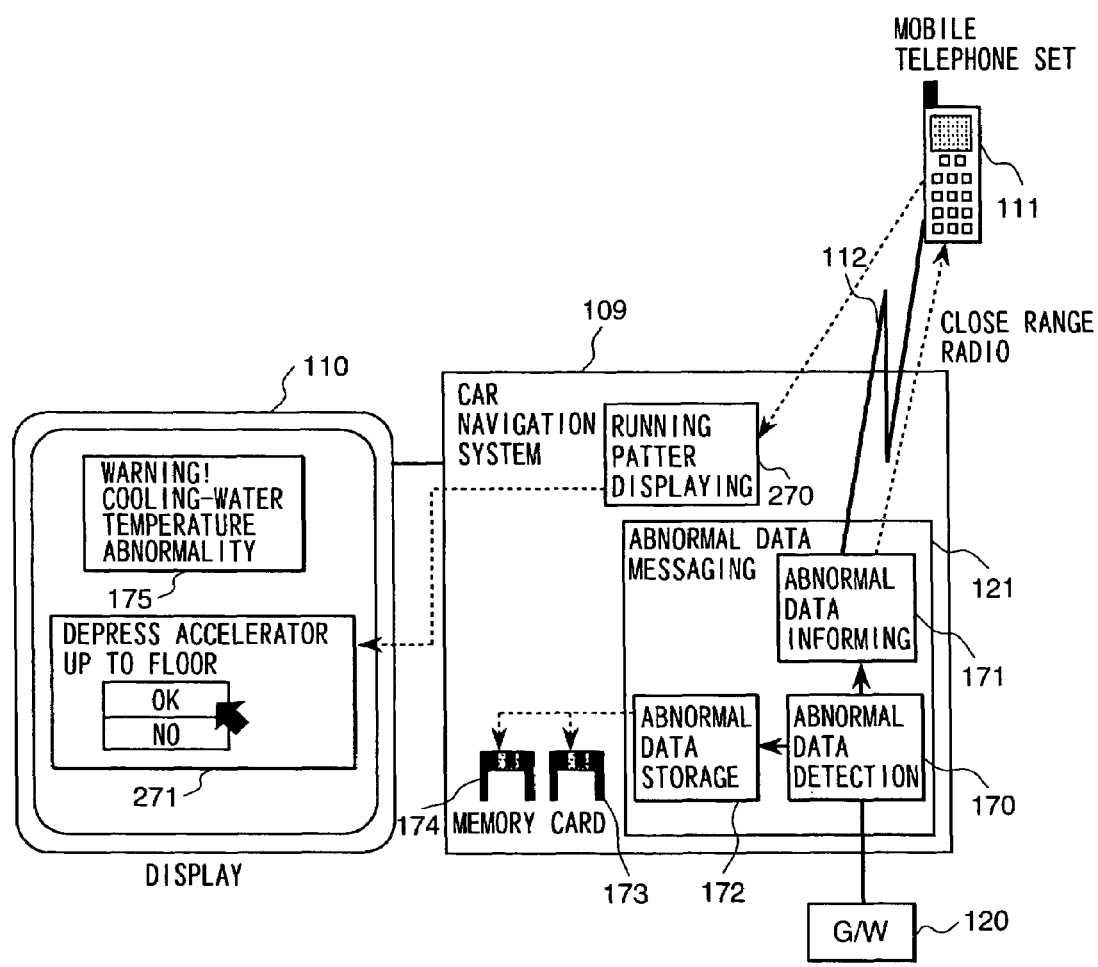
FIG. 17 shows an example of displaying the running test pattern.

The composition of car navigation system corresponding to the sixth embodiment is shown in FIG. 17. In this embodiment, running pattern display process 270 which displays running test pattern 271 sent by the server computer on display 110 is installed. The car user drives according to the test pattern. A new, abnormal data is notified that abnormal data reporting process 121 detects abnormal data while driving the test pattern.

Figure 28:
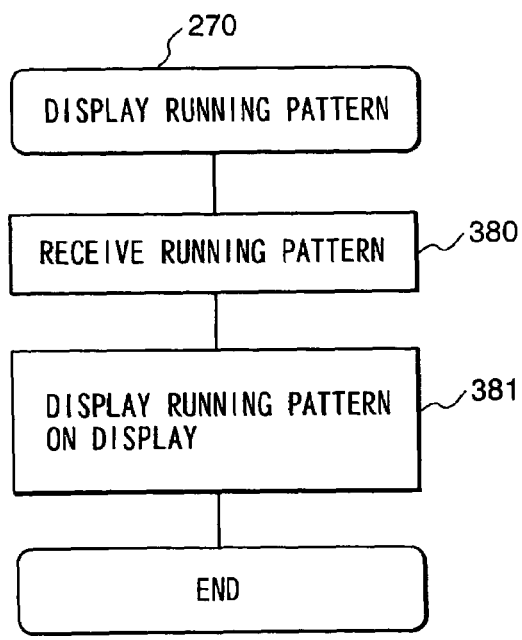
FIG. 28 shows the processing flow of running pattern display process.

FIG. 28 shows the content of the processing of running pattern display process 270. The running test pattern is received from the Internet through the cellular phone etc. (processing 380), and the test pattern is displayed in the display (processing 381). It is an alternative way instead of displaying the pertinent test pattern on the display and allowing the automotive user to test the vehicle with the pertinent test pattern that the running pattern display process 270 performs a necessary test drive automatically. However, this alternative method cannot be applicable in view of safety when a pertinent car is driving on the public road. It is not possible to do.

Figure 18:
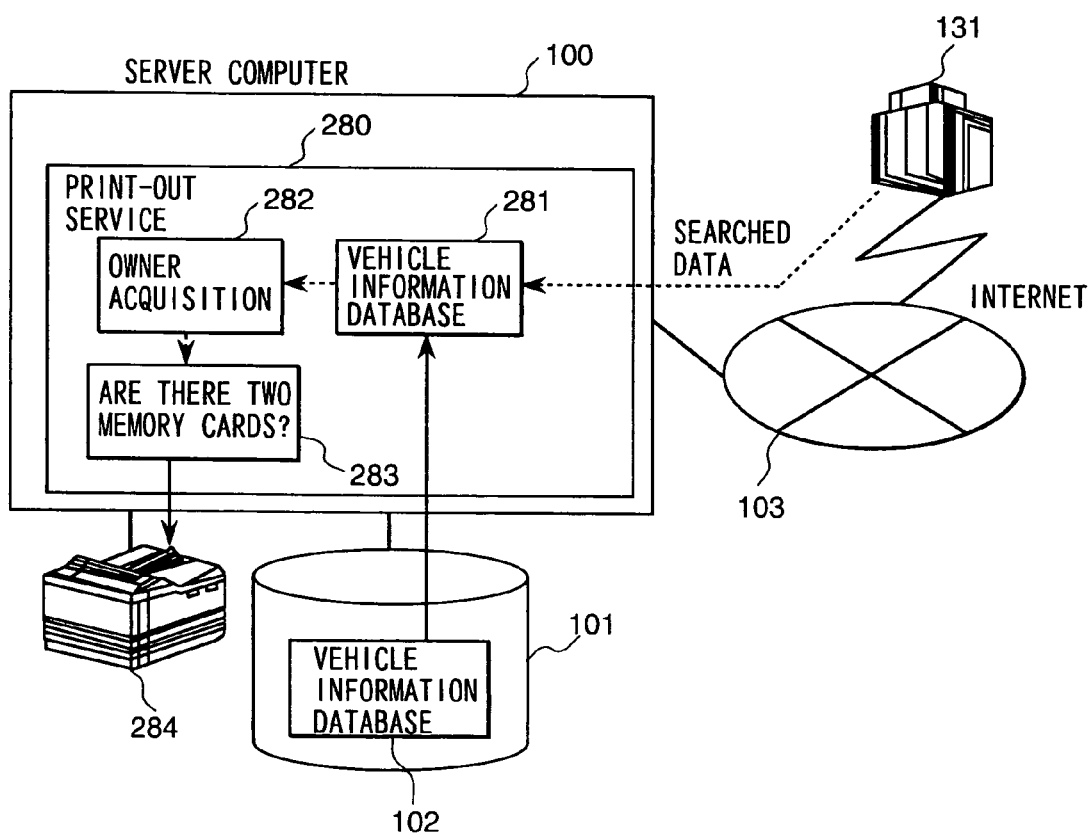
FIG. 18 shwos a configuration of the direct mail print service business.

The service company can develop various service businesses by using the vehicle information data bases collected in the embodiment of the present invention. Here, the direct mail print service system which uses the vehicle information data base is explained as an example of the service business. The system equipped with print service process 280 in FIG. 18 is shown.

Maintenance company 131 is about to send direct mail to a plurality of car users for the commercial expansion. In this case, maintenance company 131 notifies the retrieval data to which the user for the direct mail sending is shown through Internet 103. For instance ((age<40 years old) &(address<23 districts in Tokyo)& (The car inspection 1 month ago)), the retrieval data is sent. Vehicle information retrieval routine 281 acquires vehicle information corresponding to the retrieved data from the vehicle information data base 102.

Owner acquisition routine 282 takes out owner information on the vehicle corresponding to acquired information, and requests direct mail print routine 283 to print out direct mail from 284.

Figure 29:
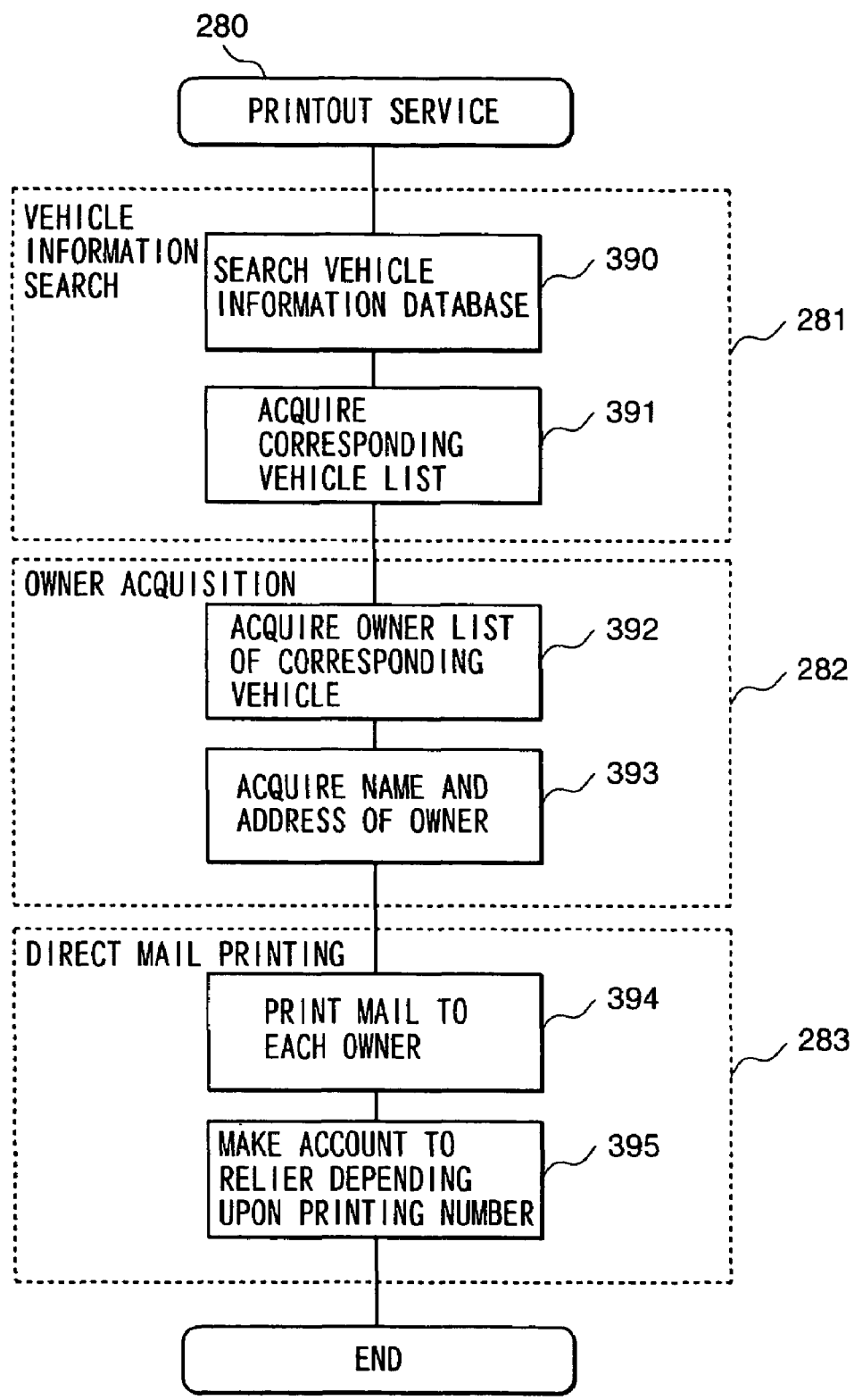
FIG. 29 shows the processing flow of the print service process.

FIG. 29 is processing flow of print service process 280. The vehicle list corresponding to the retrieval data is acquired vehicle information retrieval routine's 281 retrieving the vehicle information data base to prime (processing 390), and continuously (processing 391). Owner acquisition routine 282 acquires the owner list of the retrieved vehicle (processing 392), obtains the owner's name next, and the list of the address is obtained (processing 393). Finally, the charges according to the number of prints is processed for the maintenance company which has been being requested (processing 395) while direct mail print routine 283 prints mail on those who have each place (processing 394).

Figure 30:
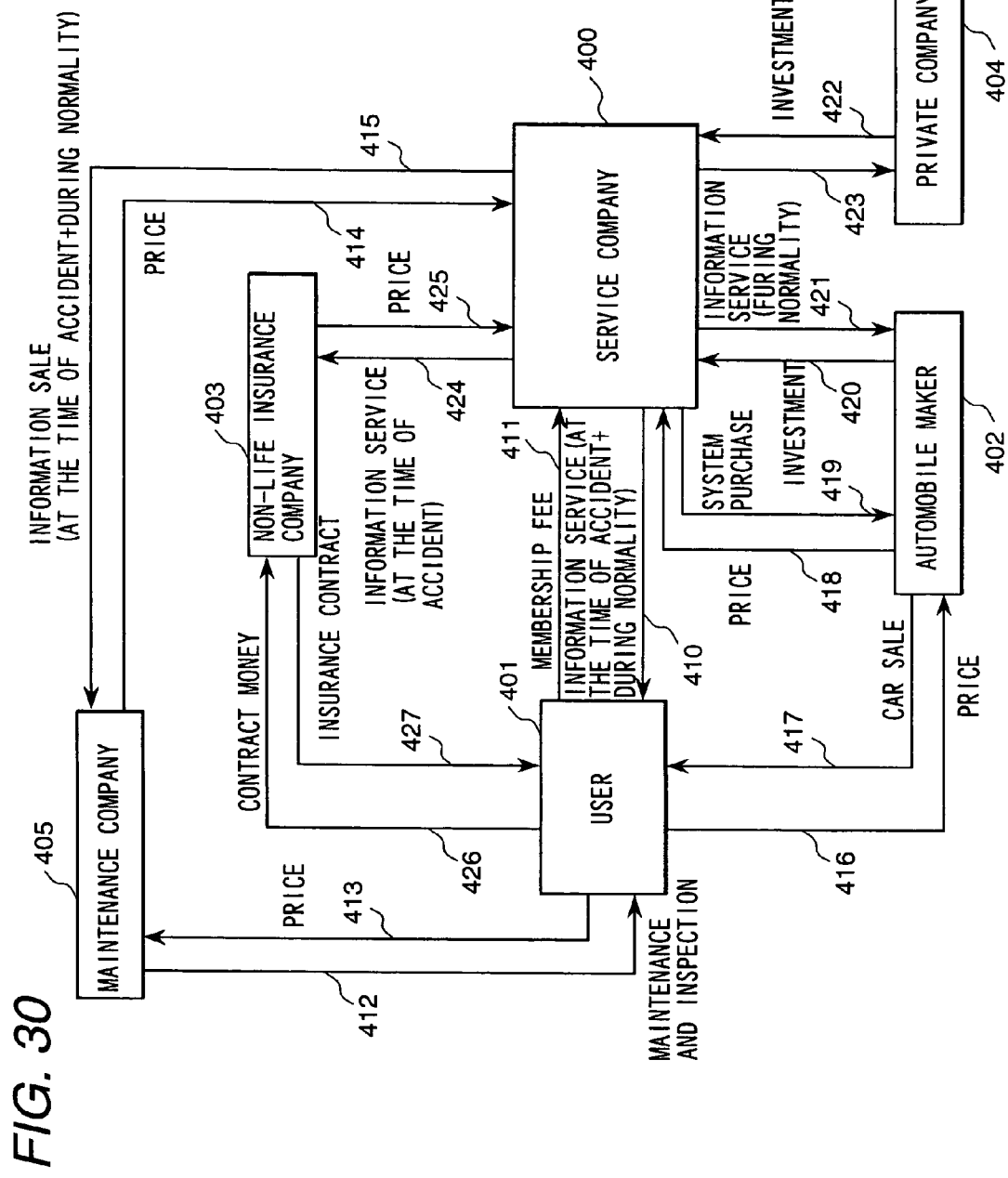
FIG. 30 shows the information and cash flow on the present invention.

Finally, information in the present invention and the flow of money are shown in FIG. 30. The suppliers of information and money in the present invention include service company 400, user 401, automaker 402, non-life insurance company 403, private company 404, and maintenance company 405. Service company 400, user 401, and maintenance company 405 use everything of FIG. 29 from FIG. 1 and the main component of the system which explains. The service company receives fee 411 from the user, and when breaking down, does dissemination 410 such as maintenance company. Here, choices that fee 411 is free are possible, too. That is, the service company is a method of earning the income by the introduction fee etc. Obtained from maintenance company etc. The relation between the service company and maintenance company consists of information sales 415 (maintenance company introduction to the user) and the introduction fee money 414 as mentioned above. When the member introduced by the service company does the maintenance order to correspondence maintenance company, maintenance company pays introduction fee money 414. Moreover, the relation same as the current state of paying maintenance money 413 to servicing 412 is approved among maintenance company 405 and users 401. It is the explained one in FIG. 29 from FIG. 1 of the present invention above in brief the explained relation.

Automaker 402 and private company 404 besides these can join. Automaker 402 and private company 404 can respectively receive dissemination 421,423 by investing in the establishment of service company 400 420,422. Acquired information is used to offer service to an individual customer in automaker and a private company. Automaker 402 buys the on-vehicle diagnostic system which shows to FIG. 1 from service company 400 again 419. This system is installed in the car merchandized by the automotive company or its auto dealers, and sold to the user 417. The payment for the car sales 417 is passed from the user to the automaker, and the payment for the purchase 419 of the on-vehicle diagnostic system passed from the automaker to the service company.

Finally, it is added that non-life insurance company 406 can participate as another component of this system. That is, it is also possible that this on-vehicle remote diagnostic system is not only a diagnosis of the vehicle breakdown but also does an urgent report at the accident. Dissemination 424 at the accident can be done from the service company to non-life insurance company by using this. Non-life insurance company invests in the service company or pays money 425 to an individual dissemination. Non-life insurance company does insurance contract 427 to an individual user, and receives contract money 426. As non-life insurance company which participates in this system can receive the dissemination at the accident, they can easily do the accident analysis. Moreover, the user comes also to bear a safer drive in mind when recognizing that a on-vehicle remote diagnostic system can be used to process the accident. Insurance can be relatively discounted from these effects, and the user, non-life insurance company, and the advantage for tri-party of the service company are caused.

The service company entered between the user and maintenance company by using the drawing, and the business model by which the breakdown measures and the maintenance estimation were supported was explained above. In this case, the charge which the user bears by this newly lying between dealings in the organization which did not exist so far improves or the margin of maintenance company decreases to the service company. If motor vehicle department gate of car dealer or principal occupation maintenance company rationalizes the business with this break-down diagnosis software so far, the user also is few the reactionary of the charge improvement or has the possibility to make to 0. In this case, the above-mentioned service company will integrate with maintenance company.

Anyway, it is necessary to buy new software, and allocate the employee who takes charge of the break-down diagnosis and the maintenance estimation by the personal computer. However, the cost as the whole can be decreased by concentrating the break-down diagnosis and the used car assessment, etc. Which have been distributed to each maintenance company and the used car sales companies so far and doing. Moreover, it is also possible to develop a new business to serve the direct mail print as shown at the end of the embodiment.

It is useful for the foresight diagnosis before break-down of major component parts, because the break-down diagnosis always monitors the operation of principal part goods of the vehicle, the change point of operation is caught, and abnormal data is recorded according to the present invention. Concretely, the precautious report is issued to the user before break-down accompanied with severe running breakdown and thus, the driver can take such an effective and saver action that the she can drive the vehicle by itself without help of a towing truck even in an emergency operation.

In addition, the maintenance can be ordered with an optimum charge by comparing the estimates from several companies.

What is claimed is:

1. An on-vehicle breakdown-warning report system, wherein
   an occurrence of break-down is detected and judged based on a signal in an electronic control system installed on a control apparatus for an engine ignition system, a charging system, an engine fuel system, a engine cooling system, a power transmission system, and an oil lubricating system of an automobile or a diagnosis display system;
   a current vehicle position and diagnostic data are sent to an information terminal device of at least a service company having plural diagnosis and maintenance agencies, as a contents information, using an on-vehicle mobile communication apparatus, and a proposal for an emergency measures and a maintenance schedule are requested; and
   said service company requests estimates for maintenance proposals from diagnosis and maintenance companies based on said current position and diagnostic data;
   an estimate for maintenance from said diagnosis and maintenance agencies, which is transmitted from said service company as a collection of responsive estimates for maintenance from said diagnosis and maintenance agencies, is received, and said estimate is presented to a user;
   said user is allowed to select a diagnosis and maintenance agency;
   the user's selection of a diagnosis and maintenance agency from among the diagnosis and maintenance agencies is received for displaying navigation information for travel to the selected diagnosis and maintenance agency, based on position information of the selected diagnostic and maintenance agency.

2. A vehicle break-down diagnosis and maintenance diagnosis system, wherein
   by comparing control data of a powertrain and vehicle control system in a designated operation condition with an allowable zone for a normal operation condition, when a break-down diagnostic processing program installed in a vehicle provides a diagnosis result indicating that said control data is located outside said allowable zone, said diagnosis result is reported to a driver with an on-vehicle display panel;
   said break-down diagnostic processing program outputs a diagnostic data card recording a history reaching an abnormal data, and transmits said diagnostic data card via a mobile data communication terminal to an information terminal of a service company having a plurality of maintenance agencies, as content information;
   said service company receives said diagnostic data card, collects responses from said maintenance agencies, including estimates for exchanging of parts and investigation and maintenance, and whether or not inspection and measurement is necessary based on said diagnostic data card and a current position, and transmits the collected responses together with position information of respective maintenance agencies; and
   said system receives said responses of said maintenance agencies and displays navigation information for travel to the maintenance agency, based on a position information of the maintenance agency, for ordering maintenance and inspection.

3. An on-vehicle breakdown-warning report system, comprising:
   a break-down diagnosis apparatus for outputting a diagnostic result based on control data for a control system including powertrain control and vehicle control in a designated operation condition, and control data for an ordinary operation condition;
   an on-vehicle panel for displaying a diagnostic result from said break-down diagnosis apparatus for individual component parts of said control system; and
   a memory apparatus for storing control data for individual component parts, or diagnostic data, as a diagnostic result obtained by comparing said control data with an allowable range;
   an on-vehicle mobile data communication terminal;
   a vehicle maintenance selection apparatus; and
   a maintenance information acquisition apparatus for,
      when a component part is specified on said on-vehicle panel, sending control data or diagnostic data for said component part, requesting maintenance information, estimate information regarding for changes required for inspection and maintenance work, and position information regarding respective maintenance agencies, to plural maintenance agencies outside a vehicle, and acquiring maintenance information individually from said plural maintenance agencies;
      for displaying acquired plural maintenance information and estimation information; and for receiving as an input a selection of a maintenance agency to which a maintenance work is ordered based displayed maintenance information and estimation information, and displaying navigation information for travel to the selected maintenance agency based on the position information of the selected maintenance agency.

4. An on-vehicle breakdown-warning report system of claim 3, wherein said control system further includes a body control and an information control.

5. An on-vehicle breakdown-warning report system of claim 3, wherein a measured data or setting data in a normal operation condition is used for a control data in a normal operation condition.

6. A server system for receiving and processing a data through a network or a public circuit comprising a vehicle information data base which stores a diagnostic data card received from a wireless communication system installed on plural vehicles, and a maintenance agency information data base in which information on the maintenance agency and service providing conditions are stored; wherein:

when said server system receives the diagnostic data card from said vehicle a break-down diagnosis is performed based on a history of a diagnostic result for the vehicle, the received diagnostic data card, and diagnostic data card for the vehicle stored in said vehicle information data base;

said server system stores an answer regarding a necessity for maintenance, an estimate for renewal parts and inspection and maintenance work, and a necessity for inspection and measurement obtained on the basis of the diagnostic result in said vehicle data card; and said server system sends information concerning a maintenance agency adapted to the service providing conditions to the vehicle.

\* \* \* \* \*